United States Patent
An et al.

(10) Patent No.: US 10,120,879 B2
(45) Date of Patent: Nov. 6, 2018

(54) SCALABLE ATTRIBUTE-DRIVEN IMAGE RETRIEVAL AND RE-RANKING

(71) Applicant: CANON KABUSHIKI KAISHA, Tokyo (JP)

(72) Inventors: Le An, Carrboro, NC (US); Changjian Zou, Palo Alto, CA (US); Liyan Zhang, Irvine, CA (US); Bradley Scott Denney, Irvine, CA (US); Dariusz Dusberger, Irvine, CA (US)

(73) Assignee: CANON KABUSHIKI KAISHA, Tokyo (JP)

( * ) Notice: Subject to any disclaimer, the term of this patent is extended or adjusted under 35 U.S.C. 154(b) by 541 days.

(21) Appl. No.: 14/555,477

(22) Filed: Nov. 26, 2014

(65) Prior Publication Data

US 2015/0154229 A1 Jun. 4, 2015

Related U.S. Application Data

(60) Provisional application No. 61/910,197, filed on Nov. 29, 2013.

(51) Int. Cl.
*G06F 17/30* (2006.01)
*G06K 9/62* (2006.01)
*G06K 9/00* (2006.01)

(52) U.S. Cl.
CPC ... *G06F 17/30247* (2013.01); *G06K 9/00281* (2013.01); *G06K 9/6263* (2013.01); *G06K 9/6272* (2013.01); *G06K 9/6234* (2013.01)

(58) Field of Classification Search
None
See application file for complete search history.

(56) References Cited

U.S. PATENT DOCUMENTS 7,203,346 B2   4/2007  Kim et al. ............. 382/118
8,553,949 B2 * 10/2013  Steinberg .......... G06K 9/00208
                                               382/118

(Continued)

OTHER PUBLICATIONS

N. Dalal, B. Triggs, Histograms of oriented gradients for human detection, in: IEEE Conference on Computer Vision and Pattern Recognition, vol. 1,2005, pp. 886-893 vol. 1.

(Continued)

*Primary Examiner* — Wilson Lee
(74) *Attorney, Agent, or Firm* — Fitzpatrick, Cella, Harper & Scinto

(57) ABSTRACT

Retrieval of images of objects from a large-scale database of object images, based on a query image. The database may, for example, contain images of objects such as faces, vehicles, people and luggage. Semantic attributes such as doors or windows in the case of vehicles are used as high level semantic cues to determine identities of objects in the images. Salient visual characteristics of the images are labeled with attribute information, and a transformation is learned so as to transform the labeled visual characteristics into a discrimination vector that discriminates between the labels. A similarity metric is learned using the discrimination vectors, such that different images depicting the same object are determined to be close while those having different objects are determined to be far apart. Candidates are retrieved based on a query image, and a re-ranking step may be applied to improve results. Validation experiments are described.

8 Claims, 19 Drawing Sheets

(56) References Cited

U.S. PATENT DOCUMENTS

| | | | |
|---|---|---|---|
| 2007/0217676 A1* | 9/2007 | Grauman | G06K 9/4671 382/170 |
| 2009/0087038 A1 | 4/2009 | Okada et al. | 382/118 |
| 2010/0111375 A1 | 5/2010 | Jones | 382/118 |
| 2011/0078159 A1* | 3/2011 | Li | G06F 17/30448 707/749 |
| 2011/0135168 A1 | 6/2011 | Hosoi | 382/118 |
| 2012/0076418 A1 | 3/2012 | Sasao et al. | 382/195 |
| 2013/0273968 A1* | 10/2013 | Rhoads | G06F 17/30244 455/556.1 |
| 2013/0290222 A1* | 10/2013 | Gordo | G06F 17/30247 706/12 |
| 2014/0348423 A1* | 11/2014 | Ishiga | G06F 17/3025 382/165 |

OTHER PUBLICATIONS

J. Kotenko, Facebook reveals we upload a whopping 350 million photos to the network daily, digitaltrends.com, visited Nov. 27, 2013, URL: http://www.digitaltrends.com/social-media/according-to-facebook-there-are-350-million-photos-uploaded-on-the-social-network-daily-and-thats-just-crazy/.

H. Zhang, Z.-J. Zha, Y. Yang, S. Yan, Y. Gao, T.-S. Chua, Attribute-augmented semantic hierarchy: Towards bridging semantic gap and intention gap in image retrieval, in: ACM International Conference on Multimedia, 2013, pp. 33-42.

J. Tang, Z.-J. Zha, D. Tao, T.-S. Chua, Semantic-gap-oriented active learning for multilabel image annotation, IEEE Transactions on Image Processing 21 (4) (2012) 2354-2360.

Z.-J. Ma, Q. Tian, J. Cai, Z. Wang, Interactive social group recommendation for flickr photos, Neurocomputing 105 (0) (2013) 30-37.

M. Eirinald, M. Louta, I. Varlamis, A trust-aware system for personalized user recommendations in social networks, IEEE Transactions on Systems, Man, and Cybernetics: Systems 44 (4) (2014) 409-421.

Z.-J. Zha, T. Mei, R. Hong, Z. Gu, Marginalized multi-layer multi-instance kernel for video concept detection, Signal Processing 93 (8) (2013) 2119-2125.

B. Geng, Y. Li, D. Tao, M. Wang, Z.-J. Zha, C. Xu, Parallel lasso for large-scale video concept detection, IEEE Transactions on Multimedia 14 (1) (2012) 55-65.

N. Kumar, P. N. Belhumeur, S. K. Nayar, FaceTracer: A Search Engine for Large Collections of Images with Faces, in: European Conference on Computer Vision (ECCV), 2008, pp. 340-353.

C. Zhu, F. Wen, J. Sun, A rank-order distance based clustering algorithm for face tagging, in: IEEE Conference on Computer Vision and Pattern Recognition, 2011, pp. 481-488.

D. Wang, S. Hoi, Y. He, J. Zhu, Mining weakly-labeled web facial images for search-based face annotation (2012).

A. Jain, B. Klare, U. Park, Face matching and retrieval in forensics applications, IEEE MultiMedia 19 (1) (2012) 20-20.

W. Wei, A. Zhang, Evaluation of low-level features by decisive feature patterns [content-based image retrieval], in: IEEE International Conference on Multimedia and Expo, vol. 2, 2004, pp. 1007-1010 vol. 2.

T. Deselaers, D. Keysers, H. Ney, Features for image retrieval: an experimental comparison, Information Retrieval 11 (2) (2008) 77-107.

B. Siddiquie, R. Feris, L. Davis, Image ranking and retrieval based on multi-attribute queries, in: IEEE Conference on Computer Vision and Pattern Recognition (CVPR), 2011, pp. 801-808.

J. Cai, Z.-J. Zha, W. Zhou, Q. Tian, Attribute-assisted reranking for web image retrieval, in: ACM International Conference on Multimedia, 2012, pp. 873-876.

Y.-H. Kuo, W.-H. Cheng, H.-T. Lin, W. Hsu, Unsupervised semantic feature discovery for image object retrieval and tag refinement, IEEE Transactions on Multimedia 14 (4) (2012) 1079-1090.

Z. Wu, Q. Ke, J. Sun, H.-Y. Shum, Scalable face image retrieval with identity-based quantization and multireference reranking, IEEE Transactions on Pattern Analysis and Machine Intelligence 33 (10) (2011) 1991-2001.

X. Chen, L. An, B. Bhanu, Improving large-scale face image retrieval using multi-level features, in: IEEE International Conference on Image Processing, 2013, pp. 4367-4371.

N. D. Thang, T. Rasheed, Y.-K. Lee, S. Lee, T.-S. Kim, Content-based facial image retrieval using constrained independent component analysis, Information Sciences 181 (15) (2011) 3162-3174.

T. Ahonen, A. Hadid, M. Pietikäinen, Face recognition with local binary patterns, in: European Conference on Computer Vision, 2004, pp. 469-481.

T. Ahonen, E. Rahtu, V. Ojansivu, J. Heikkila, Recognition of blurred faces using Local Phase Quantization, in: International Conference on Pattern Recognition, 2008, pp. 1-4.

N. Kumar, A. Berg, P. Belhumeur, S. Nayar, Describable visual attributes for face verification and image search, IEEE Transactions on Pattern Analysis and Machine Intelligence 33 (10) (2011) 1962-1977.

B. Siddiquie, R. Feris, L. Davis, Image ranking and retrieval based on multi-attribute queries, in: IEEE Conference on Computer Vision and Pattern Recognition, 2011, pp. 801-808.

D. Parikh, K. Grauman, Relative attributes, in: IEEE International Conference on Computer Vision, 2011, pp. 503-510.

B.-C. Chen, Y.-H. Kuo, Y.-Y. Chen, K.-Y. Chu, W. Hsu, Semi-supervised face image retrieval using sparse coding with identity constraint, in: ACM International Conference on Multimedia, 2011, pp. 1369-1372.

B. Smith, S. Zhu, L. Zhang, Face image retrieval by shape manipulation, in: IEEE Conference on Computer Vision and Pattern Recognition, 2011, pp. 769-776.

W. Scheirer, N. Kumar, P. Belhumeur, T. Boult, Multi-attribute spaces: Calibration for attribute fusion and similarity search, in: IEEE Conference on Computer Vision and Pattern Recognition, 2012, pp. 2933-2940.

F. Yu, R. Ji, M.-H. Tsai, G. Ye, S.-F. Chang, Weak attributes for largescale image retrieval, in: IEEE Conference on Computer Vision and Pattern Recognition, 2012, pp. 2949-2956.

A. Kovashka, D. Parikh, K. Grauman, Whittlesearch: Image search with relative attribute feedback, in: IEEE Conference on Computer Vision and Pattern Recognition, 2012, pp. 2973-2980.

B.-C. Chen, Y.-Y. Chen, Y.-H. Kuo, W. Hsu, Scalable face image retrieval using attribute-enhanced sparse codewords, IEEE Transactions on Multimedia 15 (5) (2013) 1163-1173.

P. Viola, M. J. Jones, Robust real-time face detection, International Journal on Computer Vision 57 (2) (2004) 137-154.

N. Dalai, B. Triggs, Histograms of oriented gradients for human detection, in: IEEE Conference on Computer Vision and Pattern Recognition, vol. 1, 2005, pp. 886-893 vol. 1.

O. Dèniz, G. Bueno, J. Salido, F. D. la Torre, Face recognition using histograms of oriented gradients, Pattern Recognition Letters 32 (12) (2011) 1598-1603.

M. Sugiyama, Dimensionality reduction of multimodal labeled data by local fisher discriminant analysis, J. Mach. Learn. Res. 8 (2007) 1027-1061.

K. Fukunaga, Introduction to statistical pattern recognition, Academic Press Professional, Inc., San Diego, CA, USA, 1990.

X. He, S. Yan, Y. Hu, H.-J. Zhang, Learning a locality preserving subspace for visual recognition, in: IEEE International Conference on Computer Vision, 2003, pp. 385-392 vol. 1.

H. Jegou, M. Douze, C. Schmid, P. Perez, Aggregating local descriptors into a compact image representation, in: IEEE Conference on Computer Vision and Pattern Recognition, 2010, pp. 3304-3311.

J. Sivic, A. Zisserman, Video google: a text retrieval approach to object matching in videos, in: IEEE International Conference on Computer Vision, 2003, pp. 1470-1477 vol. 2.

A. Torralba, R. Fergus, W. Freeman, 80 million tiny images: A large data set for nonparametric object and scene recognition, IEEE Transactions on Pattern Analysis and Machine Intelligence 30 (11) (2008) 1958-1970.

A. Andoni, P. Indyk, Near-optimal hashing algorithms for approximate nearest neighbor in high dimensions, in: IEEE Symposium on Foundations of Computer Science, 2006, pp. 459-468.

(56) References Cited

OTHER PUBLICATIONS

P. Poursistani, H. Nezamabadi-pour, R. A. Moghadam, M. Saeed, Image indexing and retrieval in JPEG compressed domain based on vector quantization, Mathematical and Computer Modelling 57 (2013) 1005-1017.

H. Jegou, M. Douze, C. Schmid, Product quantization for nearest neighbor search, IEEE Transactions on Pattern Analysis and Machine Intelligence 33 (1) (2011) 117-128.

K. He, F. Wen, J. Sun, K-means hashing: An affinity-preserving quantization method for learning binary compact codes, in: IEEE Conference on Computer Vision and Pattern Recognition, 2013, pp. 2938-2945.

G. B. Huang, M. Ramesh, T. Berg, E. Learned-Miller, Labeled faces in the wild: A database for studying face recognition in unconstrained environments, Tech. Rep. 07-49, University of Massachusetts, Amherst (Oct. 2007).

N. Kumar, A. Berg, P. Belhumeur, S. Nayar, Attribute and simile classifiers for face verification, in: IEEE International Conference on Computer Vision, 2009, pp. 365-372.

P. Felzenszwalb, R. Girshick, D. McAllester, D. Ramanan, Object detection with discriminatively trained part-based models, IEEE Transactions on Pattern Analysis and Machine Intelligence 32 (9) (2010) 1627-1645.

Martin Kostinger, Martin Hirzer, Paul Wohlhart, Peter M. Roth, Horst Boschof, "Large scale metric learning from equivalence constraints", Proc. IEEE Intern. Conf. on Computer Vision and Pattern Recognition, 2012.

J. V. Davis, B. Kulis, P. Jain, S. Sra, and I. S. Dhillon. "Information-theoretic metric learning". In Proc. IEEE Intern. Conf. on Machine Learning, 2007.

M. Guillaumin, J. Verbeek, and C. Schmid. "Is that you?" Metric learning approaches for face identification. In Proc. IEEE Intern. Conf. on Computer Vision, 2009.

K. Q. Weinberger, J. Blitzer, and L. K. Saul. "Distance metric learning for large margin nearest neighbor classification". In Advances NIPS, 2006.

\* cited by examiner

'Male', 'Curly Hair', 'Arched Eyebrows', 'No Beard', 'Mouth Wide Open'
'Asian', 'Wavy Hair', 'Brown Eyes', 'No Eyewear', 'Teeth Not Visible'
'White', 'Straight Hair', 'Bags Under Eyes', 'Eyeglasses', 'Smiling'
'Black', 'Receding Hairline', 'Big Nose', 'Sunglasses', 'Frowning'
'Indian', 'Bangs', 'Pointy Nose', 'Wearing Necktie', 'Attractive Man'
'Baby', 'Fully Visible Forehead', 'Big Lips', 'Wearing Necklace', 'Attractive Woman'
'Child', 'Partially Visible Forehead', 'High Cheekbones', 'Wearing Earrings', 'Blurry'
'Youth', 'Obstructed Forehead', 'Rosy Cheeks', 'Wearing Hat', 'Harsh Lighting'
'Middle Aged', 'Shiny Skin', 'Round Jaw', 'Wearing Lipstick', 'Flash'
'Senior', 'Pale Skin', 'Double Chin', 'Heavy Makeup', 'Soft Lighting'
'Bald', 'Oval Face', 'Strong Nose-Mouth Lines', 'Flushed face', 'Outdoor'
'Black Hair', 'Square face', 'Mustache', 'Narrow Eyes', 'Color Photo'
'Blond Hair', 'Round face', 'Sideburns', 'Eyes Open', 'Posed Photo'
'Brown Hair', 'Chubby', 'Goatee', 'Mouth Closed',
'Gray Hair', 'Bushy Eyebrows', '5 o" Clock Shadow', 'Mouth Slightly Open',

FIG. 2

| | HOG | Part Based Attribute Features | HOG + Re-Ranking |
|---|---|---|---|
| MAP | 0.1192 | 0.1106 | 0.1347 |
| P@10 | 0.3667 | 0.2916 | 0.3828 |
| P@20 | 0.2881 | 0.2363 | 0.3037 |

| Category | LFW | Pubfig |
|---|---|---|
| gallery subjects | 5,749 | 43 |
| gallery images | 13,113 | 3,870 |
| query subjects | 12 | 43 |
| query images | 120 | 430 |

| Dataset → | LFW | | | Pubfig | | |
|---|---|---|---|---|---|---|
| Performance → | MAP | P@10 | P@20 | MAP | P@10 | P@20 |
| HOG | 13.4% | 52.3% | 41.9% | 15.6% | 49.1% | 41.6% |
| AF | 15.8% | 56.2% | 45.4% | 18.7% | 54.5% | 48.0% |
| AFB | 15.4% | 49.0% | 38.1% | 17.1% | 52.9% | 45.1% |
| AFB+RR | 19.3% | 60.8% | 48.9% | 21.8% | 59.7% | 51.0% |

FIG. 21

| Dataset → | LFW | | | Pubfig | | |
|---|---|---|---|---|---|---|
| Performance → | MAP | P@10 | P@20 | MAP | P@10 | P@20 |
| SC | 13.0% | 46.8% | 36.2% | 14.8% | 49.0% | 40.4% |
| ASC-W | 18.3% | 57.2% | 45.3% | 20.2% | 56.4% | 47.7% |
| AEI | 14.3% | 49.0% | 37.5% | 17.6% | 51.4% | 42.8% |
| ASC-W+AEI | 18.6% | 57.3% | 45.5% | 21.0% | 56.9% | 48.3% |
| AFB+RR | 19.3% | 60.8% | 48.9% | 21.8% | 59.7% | 51.0% |

FIG. 22

SCALABLE ATTRIBUTE-DRIVEN IMAGE RETRIEVAL AND RE-RANKING

CROSS REFERENCE TO RELATED APPLICATION

This application claims priority from U.S. Provisional Application No. 61/910,197, filed Nov. 29, 2013, the contents of which are incorporated by reference herein as if set forth in full.

FIELD

The present disclosure relates to retrieval of an image or images of objects (such as images of human faces or images of people, vehicles or luggage) from a large-scale database of images based on a query image, and further relates to training and learning using the large-scale database of images in preparation for image retrieval.

BACKGROUND

Given a query image such as a query image of a human face, content-based face image retrieval (CBIR) tries to find similar face images from a large image database. Such face retrieval systems have many applications, such as automatic face annotation, missing person search, suspect search, surveillance, etc.

Traditional methods for object image retrieval usually use low level features to represent features of the object, such as low level features to represent faces. However, low level features lack semantic meaning (e.g., different people look similar) and face images usually have high intra-class variance (e.g., different face images of the same person have different expressions and poses). Recently, there has been some research to handle these problems. See Chen [33] and Wu [20].

CITATIONS

1. E. Gabarron, L. Fernandez-Luque, M. Armayones, A. Y. Lau, Identifying measures used for assessing quality of youtube videos with patient health information: A review of current literature, Interactive Journal of Medical Research 2 (1).
2. J. Kotenko, Facebook reveals we upload a whopping 350 million photos to the network daily, digitaltrends.com, visited Nov. 27, 2013, URL: http://www.digitaltrends.com/social-media/according-to-facebook-there-are-350-million-photos-uploaded-on-the-social-network-daily-and-thats-just-crazy/3.
3. Y. Gong, S. Lazebnik, A. Gordo, F. Perronnin, Iterative quantization: A procrustean approach to learning binary codes for large-scale image retrieval, IEEE Transactions on Pattern Analysis and Machine Intelligence 35 (12) (2013) 2916-2929.
4. H. Zhang, Z.-J. Zha, Y. Yang, S. Yan, Y. Gao, T.-S. Chua, Attribute-augmented semantic hierarchy: Towards bridging semantic gap and intention gap in image retrieval, in: ACM International Conference on Multimedia, 2013, pp. 33-42.
5. J. Tang, R. Hong, S. Yan, T.-S. Chua, G.-J. Qi, R. Jain, Image annotation by knn-sparse graph-based label propagation over noisily tagged web images, ACM Transactions on Intelligent Systems and Technology 2 (2) (2011) 14:1-14:15.
6. J. Tang, Z.-J. Zha, D. Tao, T.-S. Chua, Semantic-gap-oriented active learning for multilabel image annotation, IEEE Transactions on Image Processing 21 (4) (2012) 2354-2360.
7. Z.-J. Ma, Q. Tian, J. Cai, Z. Wang, Interactive social group recommendation for flickr photos, Neurocomputing 105 (0) (2013) 30-37.
8. M. Eirinald, M. Louta, I. Varlamis, A trust-aware system for personalized user recommendations in social networks, IEEE Transactions on Systems, Man, and Cybernetics: Systems 44 (4) (2014) 409-421.
9. Z.-J. Zha, T. Mei, R. Hong, Z. Gu, Marginalized multi-layer multi-instance kernel for video concept detection, Signal Processing 93 (8) (2013) 2119-2125.
10. B. Geng, Y. Li, D. Tao, M. Wang, Z.-J. Zha, C. Xu, Parallel lasso for large-scale video concept detection, IEEE Transactions on Multimedia 14 (1) (2012) 55-65.
11. N. Kumar, P. N. Belhumeur, S. K. Nayar, FaceTracer: A Search Engine for Large Collections of Images with Faces, in: European Conference on Computer Vision (ECCV), 2008, pp. 340-353.
12. C. Zhu, F. Wen, J. Sun, A rank-order distance based clustering algorithm for face tagging, in: IEEE Conference on Computer Vision and Pattern Recognition, 2011, pp. 481-488.
13. D. Wang, S. Hoi, Y. He, J. Zhu, Mining weakly-labeled web facial images for search-based face annotation (2012).
14. A. Jain, B. Klare, U. Park, Face matching and retrieval in forensics applications, IEEE MultiMedia 19 (1) (2012) 20-20.
15. W. Wei, A. Zhang, Evaluation of low-level features by decisive feature patterns [content-based image retrieval], in: IEEE International Conference on Multimedia and Expo, Vol. 2, 2004, pp. 1007-1010 Vol. 2.
16. T. Deselaers, D. Keysers, H. Ney, Features for image retrieval: an experimental comparison, Information Retrieval 11 (2) (2008) 77-107.
17. B. Siddiquie, R. Feris, L. Davis, Image ranking and retrieval based on multi-attribute queries, in: IEEE Conference on Computer Vision and Pattern Recognition (CVPR), 2011, pp. 801-808.
18. J. Cai, Z.-J. Zha, W. Zhou, Q. Tian, Attribute-assisted reranking for web image retrieval, in: ACM International Conference on Multimedia, 2012, pp. 873-876.
19. Y.-H. Kuo, W.-H. Cheng, H.-T. Lin, W. Hsu, Unsupervised semantic feature discovery for image object retrieval and tag refinement, IEEE Transactions on Multimedia 14 (4) (2012) 1079-1090.
20. Z. Wu, Q. Ke, J. Sun, H.-Y. Shum, Scalable face image retrieval with identity-based quantization and multireference reranking, IEEE Transactions on Pattern Analysis and Machine Intelligence 33 (10) (2011) 1991-2001.
21. X. Chen, L. An, B. Bhanu, Improving large-scale face image retrieval using multi-level features, in: IEEE International Conference on Image Processing, 2013, pp. 4367-4371.
22. N. D. Thang, T. Rasheed, Y.-K. Lee, S. Lee, T.-S. Kim, Content-based facial image retrieval using constrained independent component analysis, Information Sciences 181 (15) (2011) 3162-3174.
23. T. Ahonen, A. Hadid, M. Pietikäinen, Face recognition with local binary patterns, in: European Conference on Computer Vision, 2004, pp. 469-481.

24. T. Ahonen, E. Rahtu, V. Ojansivu, J. Heikkila, Recognition of blurred faces using Local Phase Quantization, in: International Conference on Pattern Recognition, 2008, pp. 1-4.
25. N. Kumar, A. Berg, P. Belhumeur, S. Nayar, Describable visual attributes for face verification and image search, IEEE Transactions on Pattern Analysis and Machine Intelligence 33 (10) (2011) 1962-1977.
26. B. Siddiquie, R. Feris, L. Davis, Image ranking and retrieval based on multi-attribute queries, in: IEEE Conference on Computer Vision and Pattern Recognition, 2011, pp. 801-808.
27. D. Parikh, K. Grauman, Relative attributes, in: IEEE International Conference on Computer Vision, 2011, pp. 503-510.
28. B.-C. Chen, Y.-H. Kuo, Y.-Y. Chen, K.-Y. Chu, W. Hsu, Semi-supervised face image retrieval using sparse coding with identity constraint, in: ACM International Conference on Multimedia, 2011, pp. 1369-1372.
29. B. Smith, S. Zhu, L. Zhang, Face image retrieval by shape manipulation, in: IEEE Conference on Computer Vision and Pattern Recognition, 2011, pp. 769-776.
30. W. Scheirer, N. Kumar, P. Belhumeur, T. Boult, Multi-attribute spaces: Calibration for attribute fusion and similarity search, in: IEEE Conference on Computer Vision and Pattern Recognition, 2012, pp. 2933-2940.
31. F. Yu, R. Ji, M.-H. Tsai, G. Ye, S.-F. Chang, Weak attributes for largescale image retrieval, in: IEEE Conference on Computer Vision and Pattern Recognition, 2012, pp. 2949-2956.
32. A. Kovashka, D. Parikh, K. Grauman, Whittlesearch: Image search with relative attribute feedback, in: IEEE Conference on Computer Vision and Pattern Recognition, 2012, pp. 2973-2980.
33. B.-C. Chen, Y.-Y. Chen, Y.-H. Kuo, W. Hsu, Scalable face image retrieval using attribute-enhanced sparse codewords, IEEE Transactions on Multimedia 15 (5) (2013) 1163-1173.
34. P. Viola, M. J. Jones, Robust real-time face detection, International Journal on Computer Vision 57 (2) (2004) 137-154.
35. N. Dalal, B. Triggs, Histograms of oriented gradients for human detection, in: IEEE Conference on Computer Vision and Pattern Recognition, Vol. 1, 2005, pp. 886-893 vol. 1.
36. O. Deniz, G. Bueno, J. Salido, F. D. la Torre, Face recognition using histograms of oriented gradients, Pattern Recognition Letters 32 (12) (2011) 1598-1603.
37. M. Sugiyama, Dimensionality reduction of multimodal labeled data by local fisher discriminant analysis, J. Mach. Learn. Res. 8 (2007) 1027-1061.
38. K. Fukunaga, Introduction to statistical pattern recognition, Academic Press Professional, Inc., San Diego, Calif., USA, 1990.
39. X. He, S. Yan, Y. Hu, H.-J. Zhang, Learning a locality preserving subspace for visual recognition, in: IEEE International Conference on Computer Vision, 2003, pp. 385-392 vol. 1.
40. H. Jegou, M. Douze, C. Schmid, P. Perez, Aggregating local descriptors into a compact image representation, in: IEEE Conference on Computer Vision and Pattern Recognition, 2010, pp. 3304-3311.
41. J. Sivic, A. Zisserman, Video google: a text retrieval approach to object matching in videos, in: IEEE International Conference on Computer Vision, 2003, pp. 1470-1477 vol. 2.
42. A. Torralba, R. Fergus, W. Freeman, 80 million tiny images: A large data set for nonparametric object and scene recognition, IEEE Transactions on Pattern Analysis and Machine Intelligence 30 (11) (2008) 1958-1970.
43. A. Andoni, P. Indyk, Near-optimal hashing algorithms for approximate nearest neighbor in high dimensions, in: IEEE Symposium on Foundations of Computer Science, 2006, pp. 459-468.
44. P. Poursistani, H. Nezamabadi-pour, R. A. Moghadam, M. Saeed, Image indexing and retrieval in JPEG compressed domain based on vector quantization, Mathematical and Computer Modelling 57 (2013) 1005-1017.
45. H. Jegou, M. Douze, C. Schmid, Product quantization for nearest neighbor search, IEEE Transactions on Pattern Analysis and Machine Intelligence 33 (1) (2011) 117-128.
46. K. He, F. Wen, J. Sun, K-means hashing: An affinity-preserving quantization method for learning binary compact codes, in: IEEE Conference on Computer Vision and Pattern Recognition, 2013, pp. 2938-2945.
47. G. B. Huang, M. Ramesh, T. Berg, E. Learned-Miller, Labeled faces in the wild: A database for studying face recognition in unconstrained environments, Tech. Rep. 07-49, University of Massachusetts, Amherst (October 2007).
48. N. Kumar, A. Berg, P. Belhumeur, S. Nayar, Attribute and simile classifiers for face verification, in: IEEE International Conference on Computer Vision, 2009, pp. 365-372.
49. P. Felzenszwalb, R. Girshick, D. McAllester, D. Ramanan, Object detection with discriminatively trained part-based models, IEEE Transactions on Pattern Analysis and Machine Intelligence 32 (9) (2010) 1627-1645.
50. Martin Kostinger, Martin Hirzer, Paul Wohlhart, Peter M. Roth, Horst Boschof, "Large scale metric learning from equivalence constraints", Proc. IEEE Intern. Conf. on Computer Vision and Pattern Recognition, 2012.
51. J. V. Davis, B. Kulis, P. Jain, S. Sra, and I. S. Dhillon. "Information-theoretic metric learning". In Proc. IEEE Intern. Conf. on Machine Learning, 2007.
52. M. Guillaumin, J. Verbeek, and C. Schmid. "Is that you?" Metric learning approaches for face identification. In Proc. IEEE Intern. Conf. on Computer Vision, 2009.
53. K. Q. Weinberger, J. Blitzer, and L. K. Saul. "Distance metric learning for large margin nearest neighbor classification". In Advances NIPS, 2006.

SUMMARY

Described herein is the application of human semantic attributes to object image retrieval and ranking, such as retrieval and ranking of face images or images of people, vehicles or luggage. The human semantic attributes are incorporated into an object image representation by linear discriminant analysis. Further described is a new metric learning algorithm to learn a similarity metric on this new image representation. Also described is an image re-ranking scheme based on the new similarity measure by combining low level feature similarity and attribute similarity.

In more detail, one embodiment described herein concerns a content-based face image retrieval and ranking system enhanced by human semantic attributes which contain semantic cues of the human faces. Low-level features are extracted to represent an image, e.g. histogram of oriented gradients (HOG). A low dimensional representation is learned (by machine learning) of face images using linear discriminant analysis (LDA) from part-based HOG features with human attributes as the LDA class labels. A metric is learned (by machine learning) on the above low dimensional features space based on identity information of a person. In addition, there is a combination of the low leveled features (HOG) and the semantic attributes features together with an image re-ranking scheme which exploits this combination.

Aspects described herein include the building a database of searchable images. According to this aspect, visual features are extracted from regions of multiple images in a first set of labeled images and the labels are applied to the extracted visual features, wherein the regions from which visual features are extracted have salient visual characteristics. A transformation is learned that uses the labels of the labeled visual features to transform the visual features into a discrimination vector, wherein the transformation is learned such that the discrimination vector discriminates between the labels. Visual features are extracted from multiple images in a second set of images different from the labeled images, wherein the regions from which the visual features are extracted have salient visual characteristics. The learned transformation is applied to the visual features extracted from the second set of images so as to transform the visual features into respective discrimination vectors for each image in the second set of images. The labeled images in the first set of images and the images from the second set of images are stored in a database in association with the respective discrimination vectors for each such image, wherein each such image is stored for retrieval by a search which at least in part uses the associated discrimination vectors.

According to various features of this aspect, the learned transformation may be learned by application of a supervised learning analysis which reduces dimensionality of the extracted visual features while preserving local neighborhood structure in the regions from which the visual features are extracted. The supervised learning analysis may use at least local Fisher discriminant analysis (LFDA). The labeled images may be labeled manually, or some of the labeled images may be labeled manually and others of the labeled images may be labeled by trained classification engines which are trained to label the images automatically. The regions from which visual features are extracted may be determined automatically so as to accentuate salient visual characteristics of objects in the images. For example, in the case of face images, the regions may include more than one of at least an eye region (left and/or right eye), a nose region, a mouth region (left part and/or right part of the mouth), a hair region and an ear region.

As used herein, a salient visual characteristic typically refers to those regions of an image of an object to which attention of a human viewer might often be focused, in situations where a human viewer is discriminating between images of different objects of the same class, or in situations where a human viewer is determining whether different images of the same class contain images of the same object or images of different objects. In one embodiment described herein, the class of object images might be face images, and salient visual characteristics might include regions of the eyes, hair, nose, mouth and/or ears, and so forth. Most images of the class would ordinarily contain all or most of these salient visual characteristics, and most human viewers would be expected to focus attention on many of these regions when determining whether different images are images of different objects or are images of the same object. In another embodiment described herein, the class of object images might be images of vehicles, and the salient visual characteristics might include regions of the wheels, doors, windows, headlights, grille, side mirrors and/or bumpers, and so forth. Most images of the class would ordinarily contain all or most of these salient visual characteristics, and most human viewers would be expected to focus attention on many of these regions when determining whether different images are images of different objects or are images of the same object. In another embodiment described herein, the class of object images might be images of people, and the salient visual characteristics might include regions of the head, arms, legs, torso, face and/or hair, and so forth. Most images of the class would ordinarily contain all or most of these salient visual characteristics, and most human viewers would be expected to focus attention on many of these regions when determining whether different images are images of different objects or are images of the same object. In another embodiment described herein, the class of object images might be images of luggage, and the salient visual characteristics might include regions of the base/wheels, handle, corners and/or luggage tags, and so forth. Most images of the class would ordinarily contain all or most of these salient visual characteristics, and most human viewers would be expected to focus attention on many of these regions when determining whether different images are images of different objects or are images of the same object.

Other aspects described herein concern retrieval of images from a searchable database based on similarity to a query image. Visual features are extracted from regions of the query image, wherein the regions from which the visual features are extracted have salient visual characteristics. A learned transformation is applied to the extracted visual features so as to transform the extracted visual features into a discrimination vector, wherein the learned transformation is learned by using labels of a labeled database of visual features to learn a transformation of the visual features into discrimination vectors that discriminate between the labels. An image similarity measure is generated between the discrimination vector for the query image and a discrimination vector for multiple images in the searchable database, wherein the similarity measure is generated using a calculation learned from a database of multiple images labeled with identities of labelable objects represented in the multiple images, and wherein the calculation measures whether the objects represented in the images are the same objects or are different objects. A candidate list is obtained of images in the searchable database that are similar to the query image based at least in part on the similarity measure.

According to various features of this aspect, the database of multiple images may be comprised of a database of face images and the objects may be comprised of individuals whose face images are included in the database, such that the calculation by which the similarity measure is generated measures whether the individuals represented in the images are the same individual or are different individuals. The similarity measure may calculate a binary vector using the discrimination vector. The similarity measure may apply a covariance matrix to the discrimination vector for the query image and to the discrimination vector for images in the searchable database, so as to provide the measurement of whether the objects represented in the images are the same object or are different objects. In addition, a re-ranking of the candidates in the candidate list may be performed based at least in part of similarity of salient visual features in the images. The re-ranking may be based at least in part on a weighted combination of similarity of salient visual features in the images and the visual features extracted from the regions of the images having salient visual characteristics.

Other aspects described herein concern comparison of objects in images, in which a plurality of respective low-level features are obtained together with a plurality of respective attribute scores for a plurality of reference object images. A refined low-level feature transformation is generated based at least in part on the plurality of respective low-level features from more than one region of the object and the plurality of respective attribute scores. An object-similarity measure is generated of a first object image and a second object image based at least in part on low-level features of the first object image, on low-level features of the second object image, and on the refined low-level feature transformation.

In other aspects described herein, retrieval of objects in images includes obtaining a plurality of respective low-level features and a plurality of respective attribute scores for a plurality of reference object images; generating a refined low-level feature transformation based at least in part on the plurality of respective low-level features from more than one region of the object and the plurality of respective attribute scores; generating an object-similarity measure of a first object image and a second object image based at least in part on low-level features of the first object image, on low-level features of the second object image, and on the refined low-level feature transformation; retrieving a subset of images from a plurality of images wherein the subset of images are retrieved based on the respective object-similarity measures of a third object image and a plurality of fourth object images; and ranking the subset of images based at least in part on the respective object-similarity measure of the third object image and one or more of the subset images and based at least in part on low-level feature similarity of the third object image and the one or more of the subset images.

Aspects also described herein include creation of an object attribute similarity metric, such as a face attribute similarity metric. According to this aspect, in the case where the object is a face, creation of a face attribute similarity metric proceeds by receiving a plurality of identified face images wherein the face images identities are such that a least some of the faces of the same individuals are labeled with the same identifier; receiving a plurality of attributes describing face images associated with an identifier; extracting a plurality of respective low-level region features from a plurality of face region images; learning an attribute subspace mapping based at least in part on the plurality of the respective low-level region features from the plurality of face region images and on face attribute labels for a plurality of attributes; mapping the plurality of low-level region features to a respective plurality of subspace region features based at least in part on the attribute subspace mapping; and creating a face attribute similarity measure based at least in part on the plurality of subspace region features and on the identifier of the face image individual.

According to such aspects, the face attribute similarity is used to measure the similarity of two faces wherein the identifier of one or more of the faces is unknown. The learning of an attribute subspace mapping may comprise an LDA subspace construction using the plurality of attributes from the identifier associated with the face image. The face attribute similarity measure may be based at least in part on a distance metric using a metric learning technique.

Aspects also described herein include retrieval of images from a large-scale database of images based on a query image, by accessing a low level feature transformation, a low dimensional projection into a semantic attribute subspace, and a distance metric; applying the low level feature transformation to the query image so as to extract low level features representative of the query image; obtaining a candidate set of images from the large-scale database of images based at least in part on similarity of the low level features for the query image to low level features of the images in the large-scale database of images; applying the low dimensional projection to the query image so as to obtain a semantic attribute projection of the query image; and ranking the candidate images based at least in part on similarity of the semantic attribute projection for the query image to semantic attribute projections of the images in the large-scale database of images so as to result in a ranked retrieval of images. Similarity of the semantic attribute projection is measured by the distance metric.

According to such aspects, the low dimensional projection into a semantic attribute subspace, and the distance metric, are both learned in a training phase from the large-scale database of images labeled with semantic attributes. The low dimensional projection into a semantic attribute subspace may use linear discriminant analysis (LDA) from part-based HOG features with human attributes as LDA class labels. Retrieval of images from a large-scale database of images may further comprise face detection and alignment of the query image using algorithms that are also applied to the images in the large-scale database of images during the training phase.

Still further according to such aspects, ranking is also based at least in part on similarity of the low level features for the query image to low level features of the candidate images, using a weighting factor that applies respective weights to similarity of the semantic attribute projection and to similarity of the low level features. The weighting factor may be learned in a training phase from the large-scale database of images labeled with semantic attributes.

Advantageous effects are derived from the arrangements described herein. Computing object image similarity is useful in different applications such as face recognition, face verification, surveillance, etc. Instead of directly computing the object similarity in the low-level feature space, object similarity may be measured in the attribute space. One advantage is that the similarity reveals the semantic content in the images of the objects, such as gender, age, and so forth, which are less prone to error due to drastic change in imaging conditions. Furthermore, a metric learning technique is used to learn a distance metric as the weight matrix in the Mahalanobis distance measure to improve the statistical distribution of the data. Thus, the images of objects sharing similar attributes will have higher similarity scores compared to those with different attributes.

This brief summary has been provided so that the nature of this disclosure may be understood quickly. A more complete understanding can be obtained by reference to the following detailed description and to the attached drawings.

BRIEF DESCRIPTION OF DRAWINGS

FIG. 2 is a view depicting seventy-three (73) attribute descriptions from Kumar [25].

FIGS. 21 and 22 are tables comparing the performance of embodiments described herein against baseline methods, for two different datasets.

DETAILED DESCRIPTION

Architecture

Figure 1:
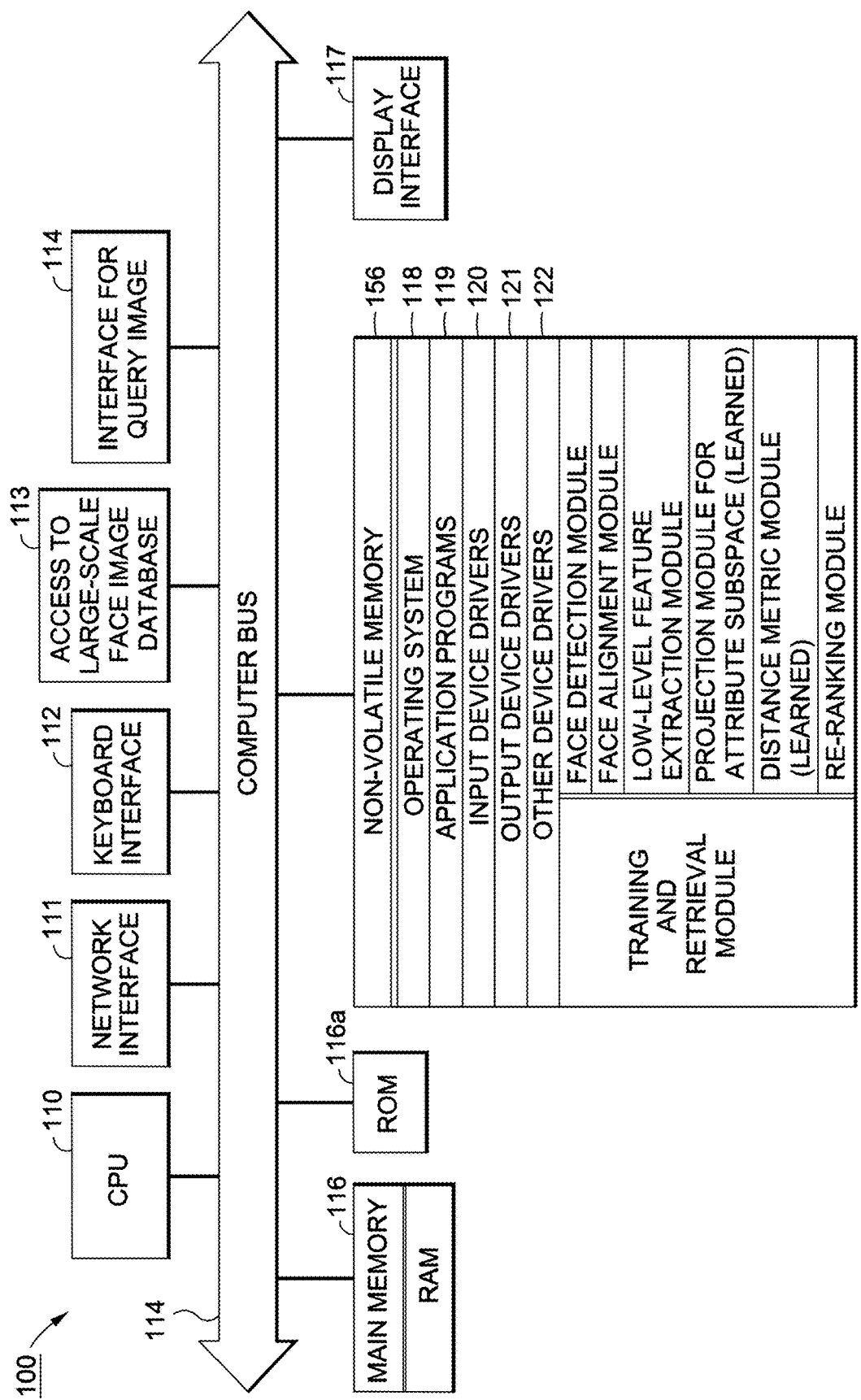
FIG. 1 is a view for explaining the architecture of computing equipment for retrieval of images of objects such as retrieval of face images, in a training phase and in a use (or testing) phase.

FIG. 1 is a view for explaining the architecture of computing equipment 100 for training and learning using a large-scale database of object images in preparation for image retrieval (i.e., a training phase) and for retrieval of an image or images from the large-scale database of object images based on a query image (i.e., a use or testing phase). The FIG. 1 embodiment is mostly directed to a large-scale database of face images in preparation for face image retrieval (i.e., the training phase) and for retrieval of a face image or images from the large-scale database of face images based on a query image (i.e., the use or testing phase).

The database of object images is a large-scale database, typically containing millions or multiple millions of images, on a scale so large that it would be wholly impracticable for either the training phase or the use phase to be accomplished by human effort alone. The embodiments described herein are computerized, as described below.

As shown in FIG. 1, computing equipment 100 includes central processing unit (CPU) 110 which interfaces with computer bus 114. Also interfacing with computer bus 114 are non-volatile memory 156 (e.g., a hard disk or other nonvolatile storage medium), network interface 111, keyboard interface 112, access 113 to a large-scale database of face images (which may be accessed from a remote site), interface 114 for receiving a query image, random access memory (RAM) 116 for use as a main run-time transient memory, read only memory (ROM) 116a, and display interface 117 for a display screen or other output.

RAM 116 interfaces with computer bus 114 so as to provide information stored in RAM 116 to CPU 110 during execution of the instructions in software programs, such as an operating system, application programs, image processing modules, and device drivers. More specifically, CPU 110 first loads computer-executable process steps from non-volatile memory 156, or another storage device into a region of RAM 116. CPU 110 can then execute the stored process steps from RAM 116 in order to execute the loaded computer-executable process steps. Data, also, can be stored in RAM 116 so that the data can be accessed by CPU 110 during the execution of the computer-executable software programs, to the extent that such software programs have a need to access and/or modify the data.

As also shown in FIG. 1, non-volatile memory 156 contains computer-executable process steps for operating system 118, and application programs 119, such as graphic image management programs. Non-volatile memory 156 also contains computer-executable process steps for device drivers for software interface to devices, such as input device drivers 120, output device drivers 121, and other device drivers 122.

Non-volatile memory 156 also stores a training module and a retrieval module, which may comprise computer-executable process steps for training and learning using a large-scale database of face images in preparation for face image retrieval (i.e., the training phase) and for retrieval of a face image or images from the large-scale database of face images based on a query image (i.e., the use or testing phase).

The computer-executable process steps for these modules may be configured as part of operating system 118, as part of an output device driver in output device drivers 121, or as a stand-alone application program. These modules may also be configured as a plug-in or dynamic link library (DLL) to the operating system, device driver or application program. It can be appreciated that the present disclosure is not limited to these embodiments and that the disclosed modules may be used in other environments.

The training module and a retrieval module correspondingly include a plurality of modules including a module for face detection which identifies those region(s) of an image that contain a face or faces, a module for face alignment which normalizes the appearance of the image of the face, a module for extraction of low-level features from the aligned face, such as HOG features (histogram of oriented gradients), a module for projecting the face image into a subspace that captures semantic attributes of the face image, a distance metric module for measuring distances between (for example) attributes for a query image and attributes for images in the large-scale database of face images, and a re-ranking module.

The module for projection into a semantic attribute subspace and the module for the distance metric are both learned modules (machine learning) based on training and learning using the large-scale database of face images in preparation for face image retrieval (training phase). These learned modules are thereafter used for query images in the testing/use phase. The re-ranking module may also be learned. This is described in greater detail below.

<A First Implementation>

Referring to the FIG. 1 architecture, a first implementation will now be described.

As stated previously, recently there has been significant interest in attribute learning for various tasks such as object recognition, face recognition, etc. An attribute is a semantic description for a given image. Unlike the low-level feature representations which are not directly comprehensible by a human being, describing an image using semantic attributes (e.g., young, black hair, female) complies with the human cognition pattern.

Previous efforts in face recognition or verification focus on extracting robust low-level features from the image or learn advanced classifier for better discrimination. Kumar [25] proposes use of attributes for face verification. See Kumar [25]. In total 73 attribute classifiers were trained using SVM with trained accuracies span from 70% to 90%. The detected attributes are used in the task of face verification on LFW database and state-of-the-art results are achieved.

FIG. 2 shows the seventy-three (73) attribute descriptions the attributes used by Kumar in [25].

Recently, an attribute enhanced scalable face image retrieval method is proposed in Chen [33], in which the sparse coding is performed in different attribute space. Based on the attribute of the query image, corresponding codewords are used for retrieval. To further take into consideration the attribute confidence, instead of using a hard assignment, a soft weighted version is used to incorporate codewords from different attribute space.

The similarity between two given faces is usually measured by the similarity or distance between the feature descriptors extracted from the original images. However, the faces to be compared are often taken under different conditions such as varying pose, illumination, expression, image resolution, etc. Thus directly extracting low-level features and then calculating the similarity between the low-level features might be prone to error. Although researchers aim at extracting invariant feature descriptors against different pose and illumination, it is very challenging to find features that are robust and invariant in these changing aspects.

In this embodiment, face similarity is measured also based on facial semantic attributes, such as male or female or those given in FIG. 2 above, which is invariant to the change in image conditions. In this manner, face similarity can be measured semantically based on the detected attributes instead of on low-level features which heavily rely on the appearance of the images. To further improve the similarity measure, metric learning is used to enhance the similarity between faces with similar attributes while further separating faces with dissimilar attributes.

The proposed face similarity measurement consists of two stages: a first phase of training and a second phase of testing/use. In the training stage, the faces in the input images are first detected and aligned. Then the low-level features (such as LBP or HOG) are extracted from the faces. The attribute labels are known for the training images. For each attribute, an LDA projection matrix is learned which projects the training images into one dimensional subspace in which the class separation is maximized. The projected features for different attributes are then concatenated to form a new attribute feature representation for the face image, the dimension of which is determined by the number of attributes used. Then given the image pairs from same individuals and image pairs from different individuals, the attribute features are used to learn a distance metric.

In the testing/use stage, given two images, first the low-level features are extracted from the detected and aligned faces. Then the learned LDA projection matrices are used to project the low-level features into individual one dimensional features. The concatenated attribute features are then used for similarity measure in the form of Mahalanobis distance, in which the learned metric are used.

In other embodiments, the large-scale database of images is comprised of object images of a class or classes different from the class of face images. For example, the large-scale database of object images may be comprised of images of vehicles, images of people or images of luggage, or it might be comprised of multiple different classes of object images including all or some of face images, vehicle image, people images, luggage images and other classes of images.

For each such class of object images, there are corresponding salient visual characteristic and attributes. Suitable attributes for the class of face images have been described above, and suitable salient visual characteristics are described below. For the class of vehicle images, suitable salient visual characteristics may include regions of the wheels, doors, windows, headlights, grille, side mirrors and/or bumpers, and so forth. For the class of vehicle images, suitable attributes may include the following:

Two-door/Four-door, Convertible, Van, Compact, Full Size, Truck, Sports car, Station Wagon, SUV, Motorcycle, Top color, Bottom color, Occupied, Clean/Dirty, Dents/Marks, Bumper Stickers, Window Stickers, License Plate (such as none or state or color), Wheels (Rims), Metallic Colors (such as Smoke, Burgundy, Dark blue, Medium Blue, Silver Gold), Reflective Colors (such as Chrome, Black, Red, Blue, White, Orange), Specialty Colors (such as Carbon Fiber, Brush Aluminum, Shade Shifter), Standard Colors (such as Black, Sapphire blue, Plum purple, Gold, Dark green, Medium gray, Intense blue, Burgundy, Brite orange, Medium green, Silver/Gray, Royal purple, Brite cardinal red, Yellow, Kiwi, Titanium, Pink, Perfect match red, Beige, White), Vehicle Configuration, Cargo Body Type.

For the class of people images, suitable salient visual characteristics may include regions of the head, arms, legs, torso, face and/or hair, and so forth. For the class of people images, suitable attributes may include the following:

Male, Female, Attire (such as Business, Business casual, Casual, Uniform, Jacket), Top color of torso, Bottom color of torso, Age (such as Young, Middle age, Old), Complexion, Hair (such as bald or partially bald and color), Weight, Height, Scars, Tattoos.

For the class of luggage images, suitable salient visual characteristics may include regions of the base/wheels, handle, corners and/or luggage tags, and so forth. For the class of luggage images, suitable attributes may include the following:

Closure (such as Closes without zippers, Closes with zippers), Material Elements (such as Dual Soft/Hard, Leather, Metal, Tweed), External Elements (such as Combination Locks, Retractable Handles, Straps to Close/Secure, Wheels/Rollers), Color (such as White, Silver/Gray, Red, Patterned, Beige, Medium Green, Black, Blue, Yellow, Burgundy, Royal Purple).

Figure 3:
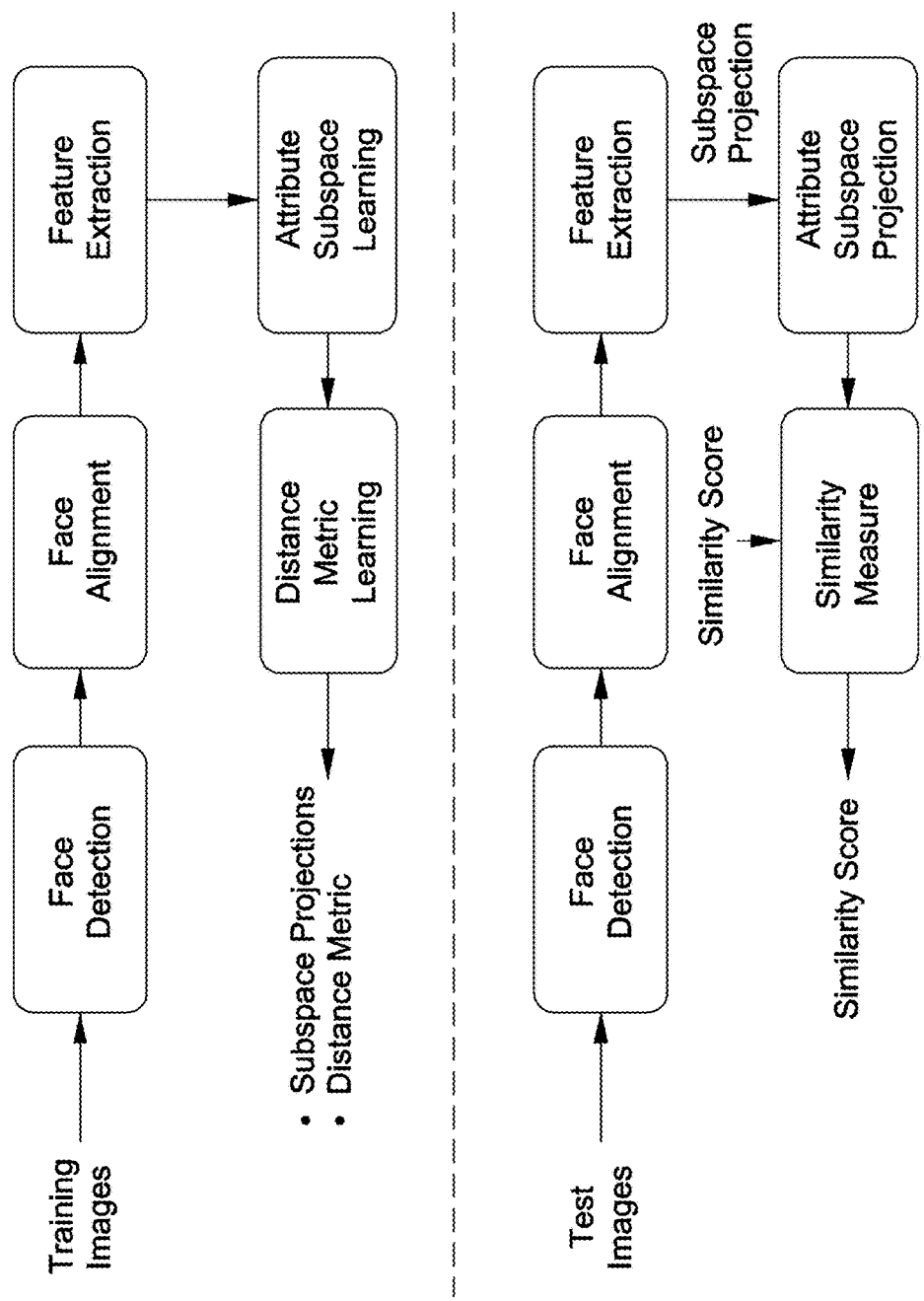
FIG. 3 is a view depicting a framework according to one embodiment described herein.

FIG. 3 is a view depicting a framework according to one embodiment described herein, pertinent to object images in general and to face images in particular. FIG. 3 shows the relationship between the training stage and the testing/use stage. Both the training stage and the testing/use stage include low-level feature extraction, including face detection, face alignment and feature extraction. In the training stage, machine learning is applied to obtain a transformation into an attribute subspace and to obtain a distance metric. In the testing/use stage, the learned transformation is applied to transform the extracted low-level features into an attribute subspace, and the learned distance metric is applied to obtain a similarity measure. These aspects are described more fully below.

Low-level feature extraction: Low-level feature extraction includes processes for face detection and alignment so as to obtain a normalized face image, and feature extraction from the normalized face image. These processes will now be explained.

For every image in the large-scale database of face images, the locations of faces can be found by applying a face detector. Next fiducial points on the face are extracted. Using the fiducial points, the faces are aligned, and the aligned faces are used to generate face parts/regions that are significant for discriminant tasks.

Figure 4:
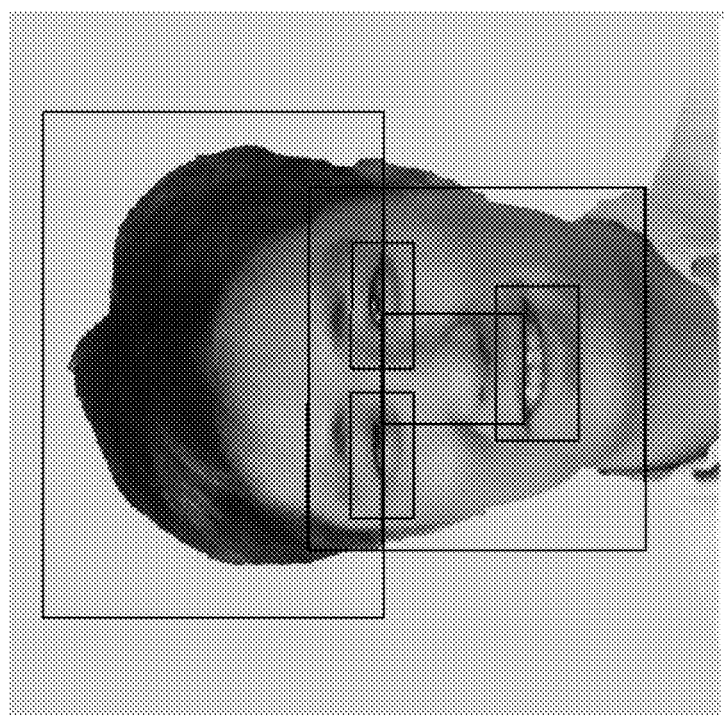
FIG. 4 illustrates face parts that are generally used in face recognition for creating a feature pool.

FIG. 4 illustrates face parts that are generally used in face recognition for creating a feature pool. These face parts comprise salient visual characteristics for the class of face images, and here may include regions of the eyes, hair, nose, mouth and/or ears, and so forth.

For each face part, small patches such as 8 by 8 small patches are extracted and for each patch, a HOG feature vector is extracted with the number of orientation bins being set to 31. Such image representations are robust to face pose and expression variations.

As another example of face detection and alignment: The faces are first detected using a boundary box for a face detector. The bounding box is defined in the face region and the locations of the fiducial points are returned. To align the faces to a canonical position, the locations of the centers of left eye and right eye as well as the center of the mouth are used.

Figure 5:
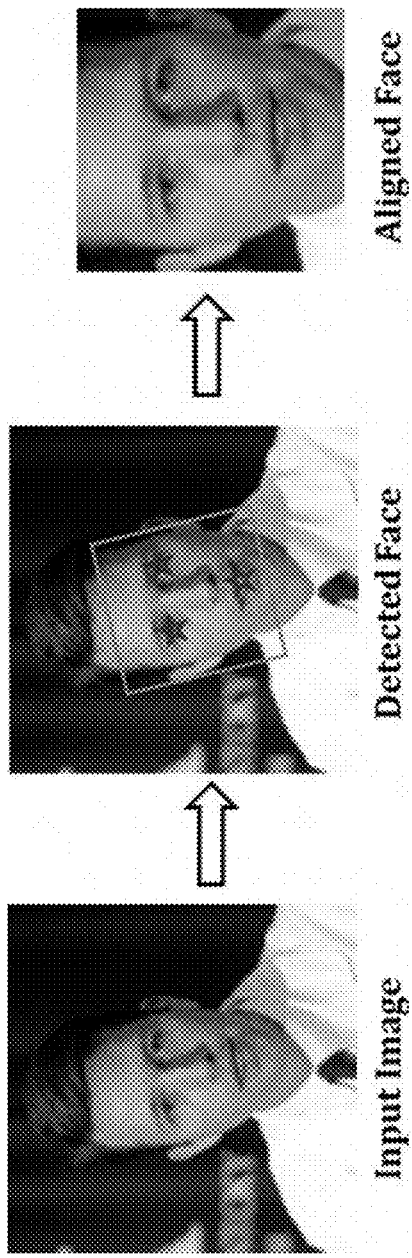
FIG. 5 shows an example of a face alignment process.

FIG. 5 shows an example of the face alignment process.

Low-Level Feature Extraction from aligned face images: Various feature descriptors can be used in the proposed framework. This embodiment uses Histogram of Oriented Gradients (HOG) as the feature descriptor. HOG was originally proposed for human detection with success. See Dalal [35]. HOG operates by first computing the image gradients in horizontal and vertical directions of an image. The image is then divided into blocks, and for each block, the orientation for each pixel is binned into evenly divided orientation channels spreading from 0 to 180 degrees or to 360 degrees. The final descriptor is the concatenations of HOG histograms from each block. Since the HOG feature is a local-region based descriptor, it tolerates some geometric and photometric variations.

Figure 6:
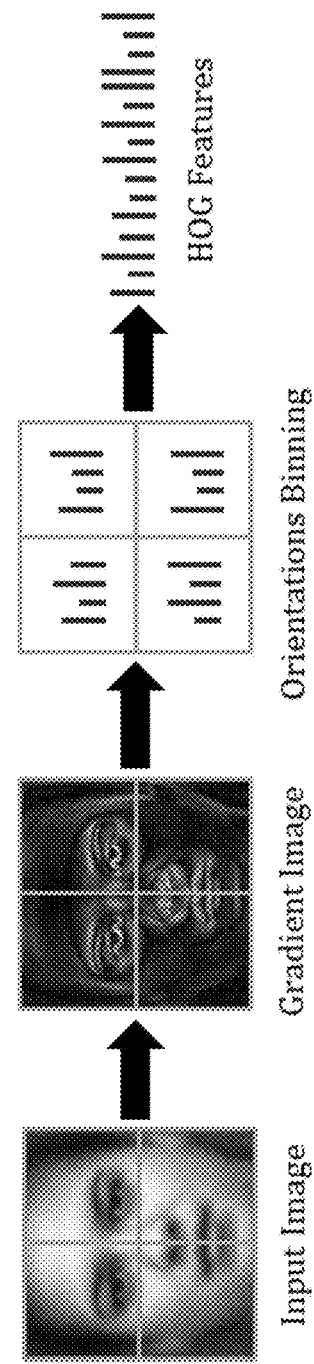
FIG. 6 is a conceptual view for illustrating extraction of HOG features (histogram of oriented gradients).

FIG. 6 is a conceptual view for illustrating extraction of HOG features (histogram of oriented gradients).

Learning for projection into the semantic attribute subspace will now be explained. In general, such learning is machine-based learning, using, for example, linear discriminant analysis (LDA). The projection learned in this training phase is thereafter used in the testing/use phase, so as to project a query image into the semantic attribute subspace.

It might to some be intuitive to think that the results of attribute classifiers could be used as features to compute face similarity. However, in this embodiment the output of the attribute classifiers is not used directly because there is no guarantee of the accuracy of the classifiers for many attributes at the resolution of face images under consideration. And also, there is a general intent not to lose too much spatial and low level visual features because they might be helpful in capturing distinguishable characteristics of an individual (such as a birth mark or scar or even face part proportions for example) that are not encoded with attributes. Thus, linear discriminant analysis is used to get a low dimensional representation of face images. To make use of spatial information, LDA is applied to the patches in each face part which is shown diagrammatically in FIG. 7.

Figure 7:
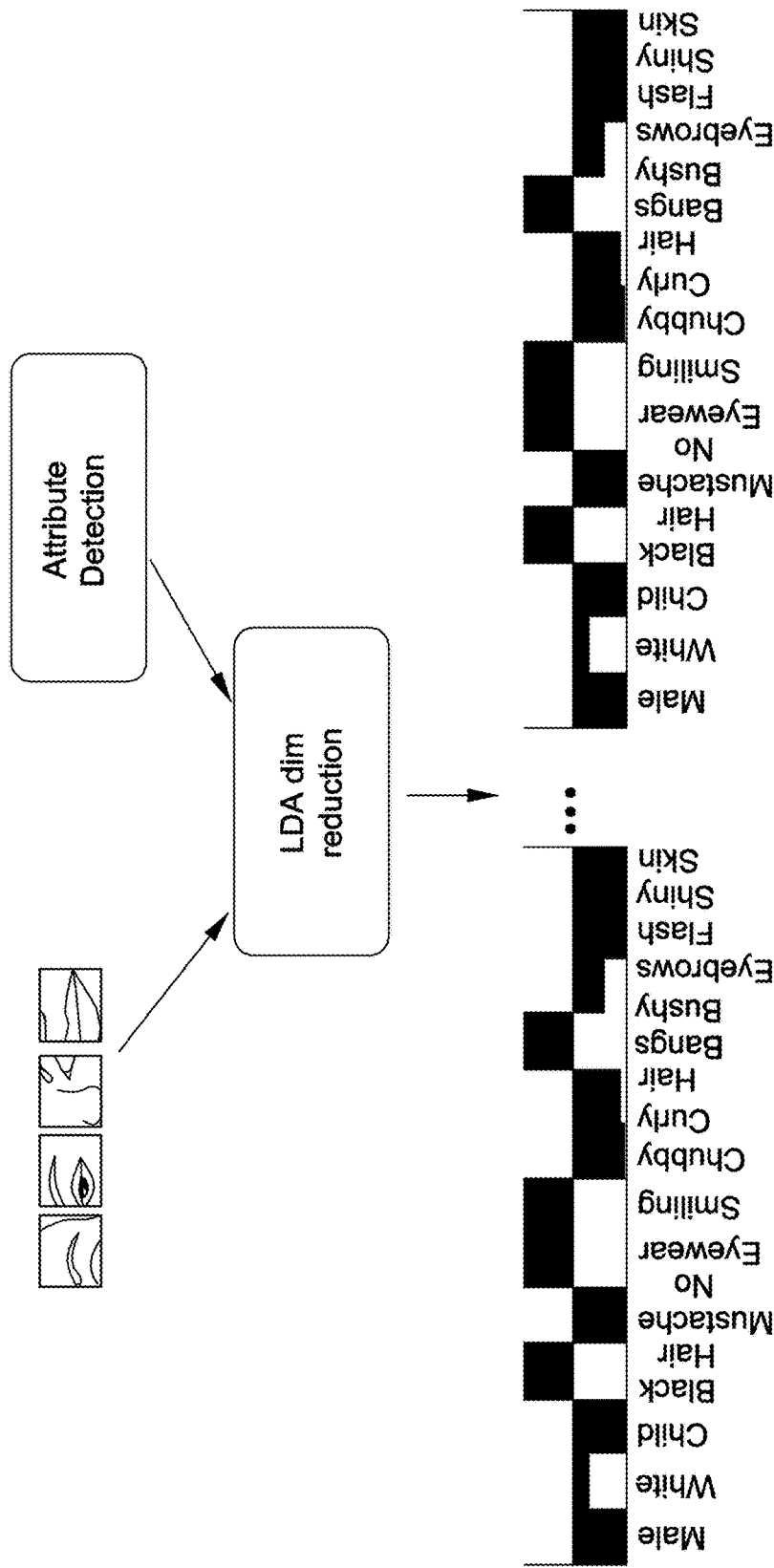
FIG. 7 is a conceptual view for illustrating application of LDA (linear discriminant analysis) to patches of different face parts.

FIG. 7 is a conceptual view for illustrating application of LDA (linear discriminant analysis) to patches of different face parts. LDA finds the subspace linear projections that minimize the within attribute class scatters while maximizing the between class scatter.

LDA can reduce the dimensionality of a feature to at most $C-1$ dimension where C is the number of attribute classes. For this reason each patch is reduced to a $C-1$ dimensional vector. But because the patches are thought to capture differing characteristics with respect to the attributes, the combination of the patches provides a useful attribute-enhanced reduced dimensionality vector.

In more detail, in the training process, the face images are provided with attribute labels, these attributes include diverse categorization of human, such as gender, age, ethnicity, etc. For each attribute, positive face examples that contain this attribute and negative face examples in which this attribute are absent are used to learn an LDA (Linear Discriminant Analysis) projection matrix, with which the low-level features extracted from the face are linearly combined to achieve the class separation. More specifically, for each image patch, K LDA projection matrices are learned for the K attributes. Then the low-level features are projected into 1D scalars for each attribute respectively. In total K scalars are concatenated to form a K dimensional attribute descriptor for this image patch. Suppose there are N patches from the image; the final attribute descriptor is the concatenation of individual attribute descriptor from each patch, and the length of the final attribute descriptor for the entire face is N×K.

Figure 8:
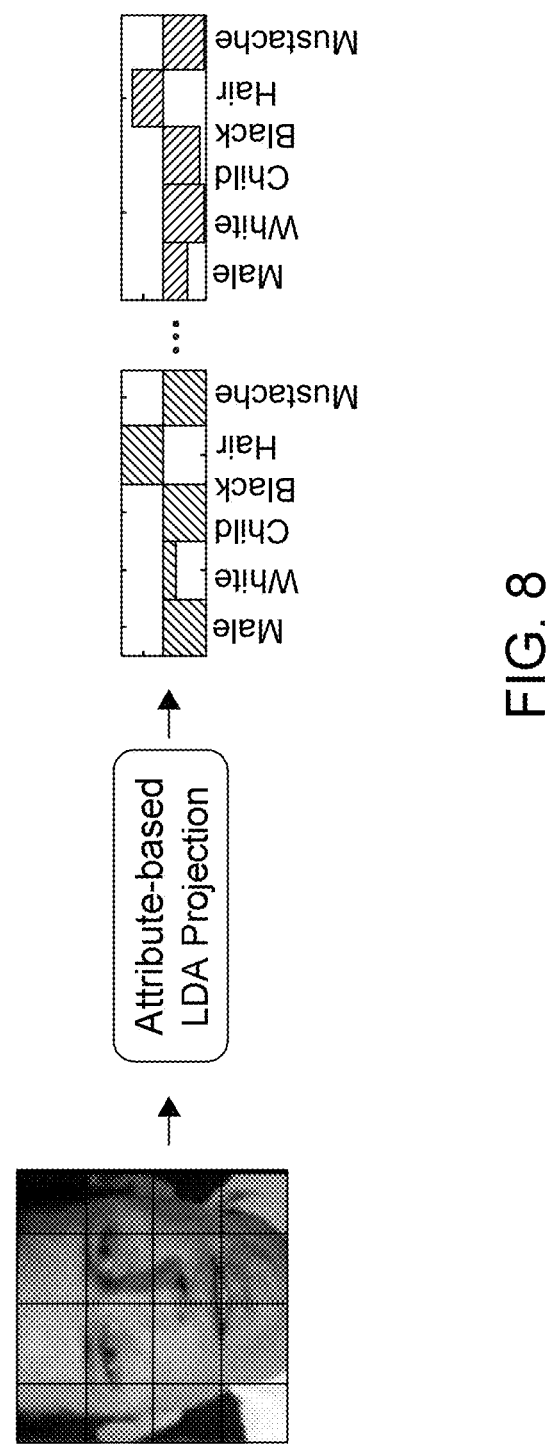
FIG. 8 is a conceptual view for illustrating the generation of attribute features using LDA projection.

FIG. 8 is a conceptual view for illustrating the generation of attribute features using LDA projection. FIG. 8 thus diagrammatically illustrates the process of attribute-based projection.

In the testing step, given a face, it is first divided into patches. For each patch, the LDA projection for each attribute transforms the low-level features of this patch to the attribute features. Then the composite attribute features are constructed by gathering all the patch-based attribute features.

Metric learning for face similarity measurement will now be explained. In general, the metric is designed to measure similarity of face images for the same person, even though such images are captured at different times, under different lighting conditions, and with different poses and so forth, such that different face images of the same person are designated as close matches whereas face images of different persons are designated as quite different. The distance metric is learned through machine learning, described below.

Learning a distance or similarity metric based on the class of Mahalanobis distance functions has gained considerable interest in computer vision. The popular algorithms for learning a Mahalanobis metric include large margin nearest neighbor (LMNN, see Weinberger [53]), information-theoretic metric learning (ITML, see Davis [51]) and logistic discriminant metric learning (LDML, see Guillaumin [52]). In this embodiment, an effective metric is able to be learned just based on equivalence constraints. See Kostinger [50].

That is, in this embodiment it is possible to use only the information on whether two face images belong to the same person or not. To reduce the number of parameters (the size of the metric) and improve generalization capability, a metric is learned on the attribute features from each small patch of a face which is shown in an example case in FIG. 9.

Figure 9:
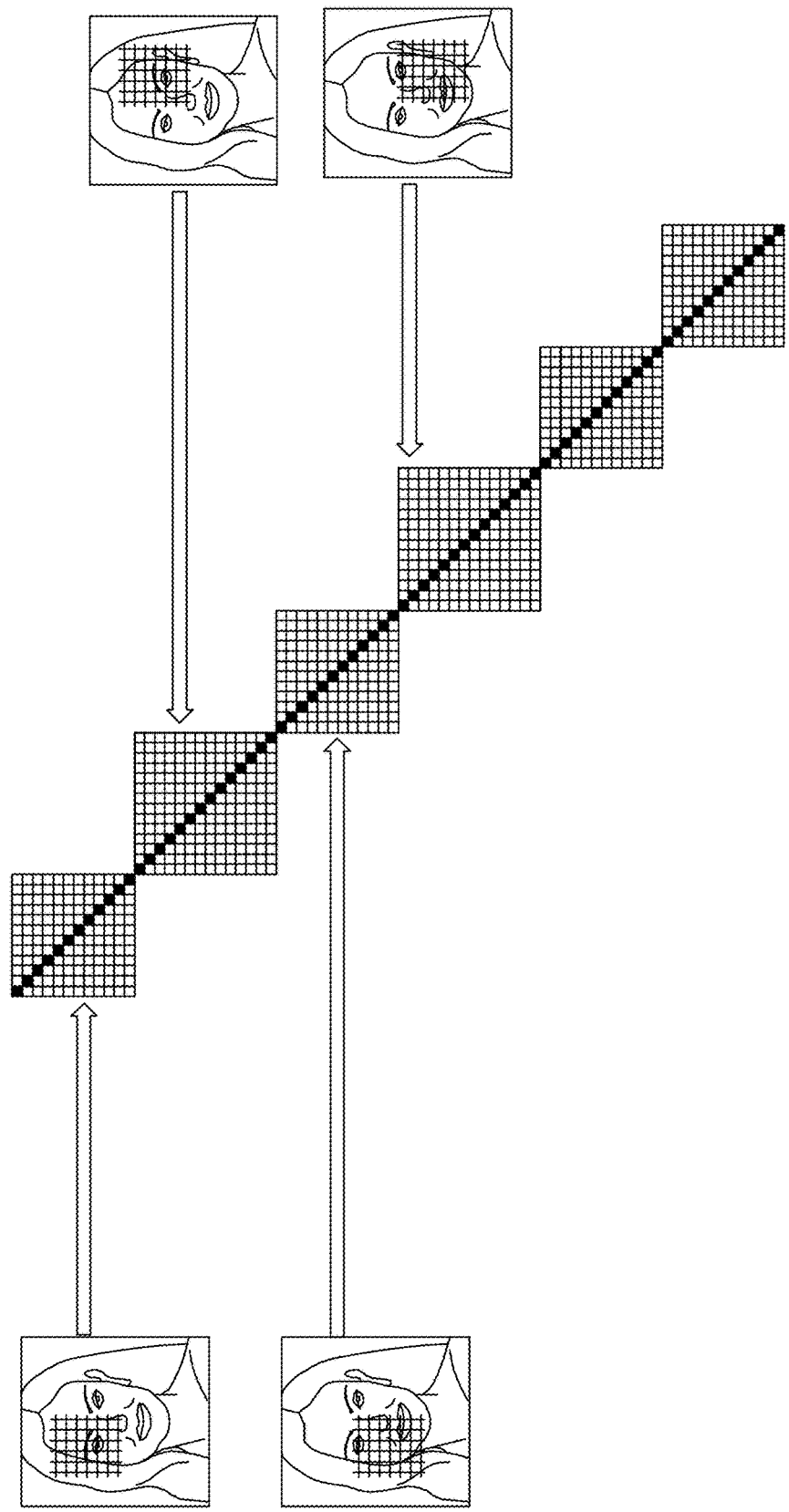
FIG. 9 is a conceptual view for illustrating the learning of a block-wise metric on the attribute features from each small patch of different face parts.

FIG. 9 is a conceptual view for illustrating the learning of a block-wise metric on the attribute features from each small patch of different face parts.

One example of the definition of the Mahalanobis distance between two feature vectors is as follows:

$$d_M(x_i, x_j) = (x_i - x_j)^T M (x_i - x_j) \quad (a)$$

where M≥0 is a positive semi-definite matrix and $x_i$ and $x_j$ are two sample points.

More specifically, a face similarity metric in this embodiment is learned based on the class of Mahalanobis distance and equivalence constraint. That is, the primary consideration is whether two face images belong to the same person or not. To reduce the number of parameters (the size of the metric matrix) and improve generalization capacity, a metric is learned on the attribute features in each patch which is shown in FIG. 10.

Figure 10:
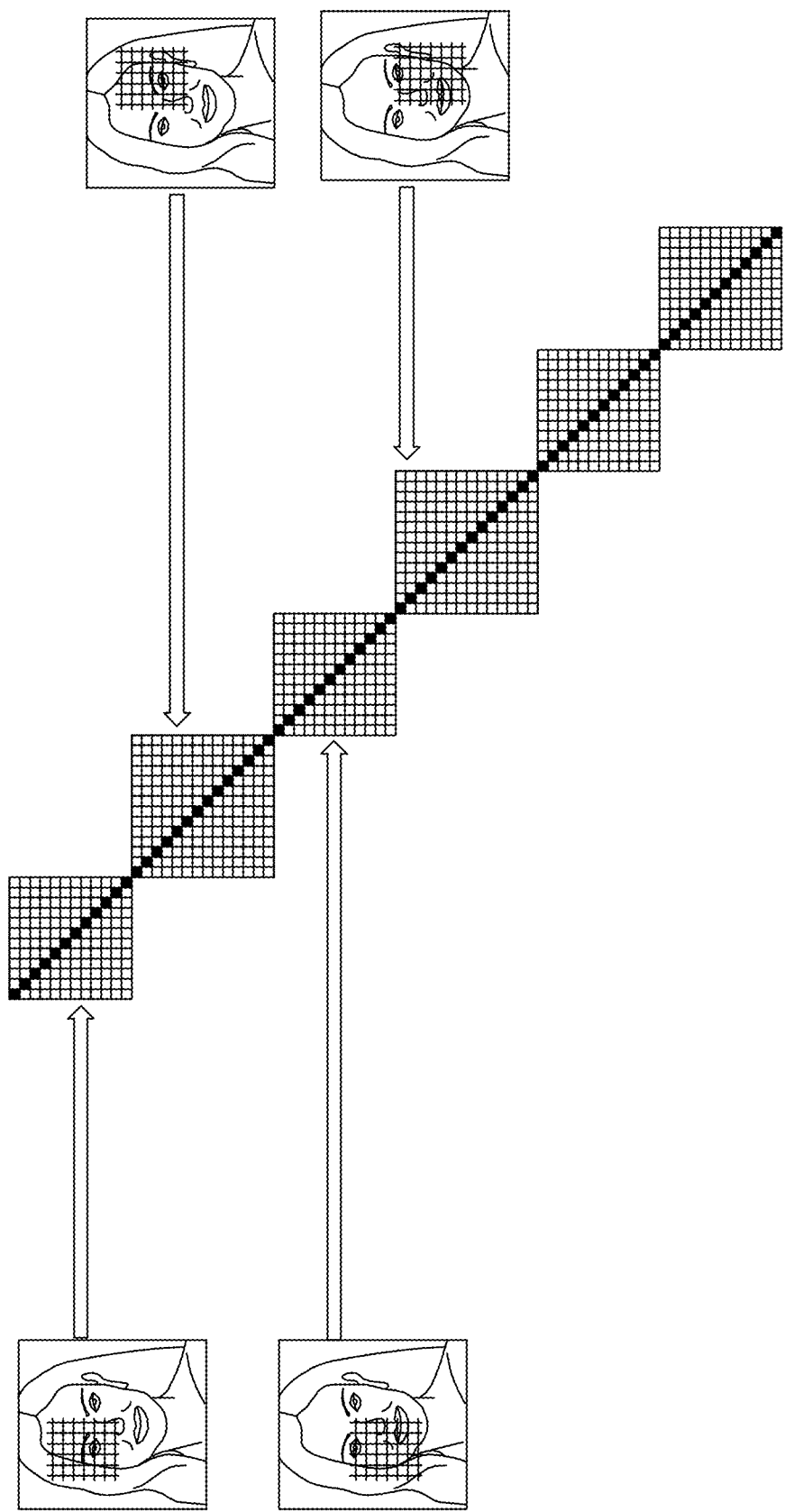
FIG. 10 is likewise a conceptual view for illustrating the learning of a block-wise metric on the attribute features from each small patch of different face parts.

Like FIG. 9, FIG. 10 is also a conceptual view for illustrating the learning of a block-wise metric on the attribute features from each small patch of different face parts.

The face similarity for two faces are calculated using the form of Mahalanobis distance in the following equation with M learned for metric learning in the aforementioned step:

$$d(x,y) = \sqrt{(x-y)^T M (x-y)} \quad (b)$$

where x and y denote attribute features from two images. The similarity can be calculated by simply reversing the distance score.

The testing/use phase will now be described, in which the learned projection into attribute space, and the learned distance metric, are applied against a query image so as to retrieve candidate images from the large-scale database of face images, after which there is a re-ranking of the candidates using the semantic attributes so as to result in face images which are believed to be images from the same person as the query image.

Figure 11:
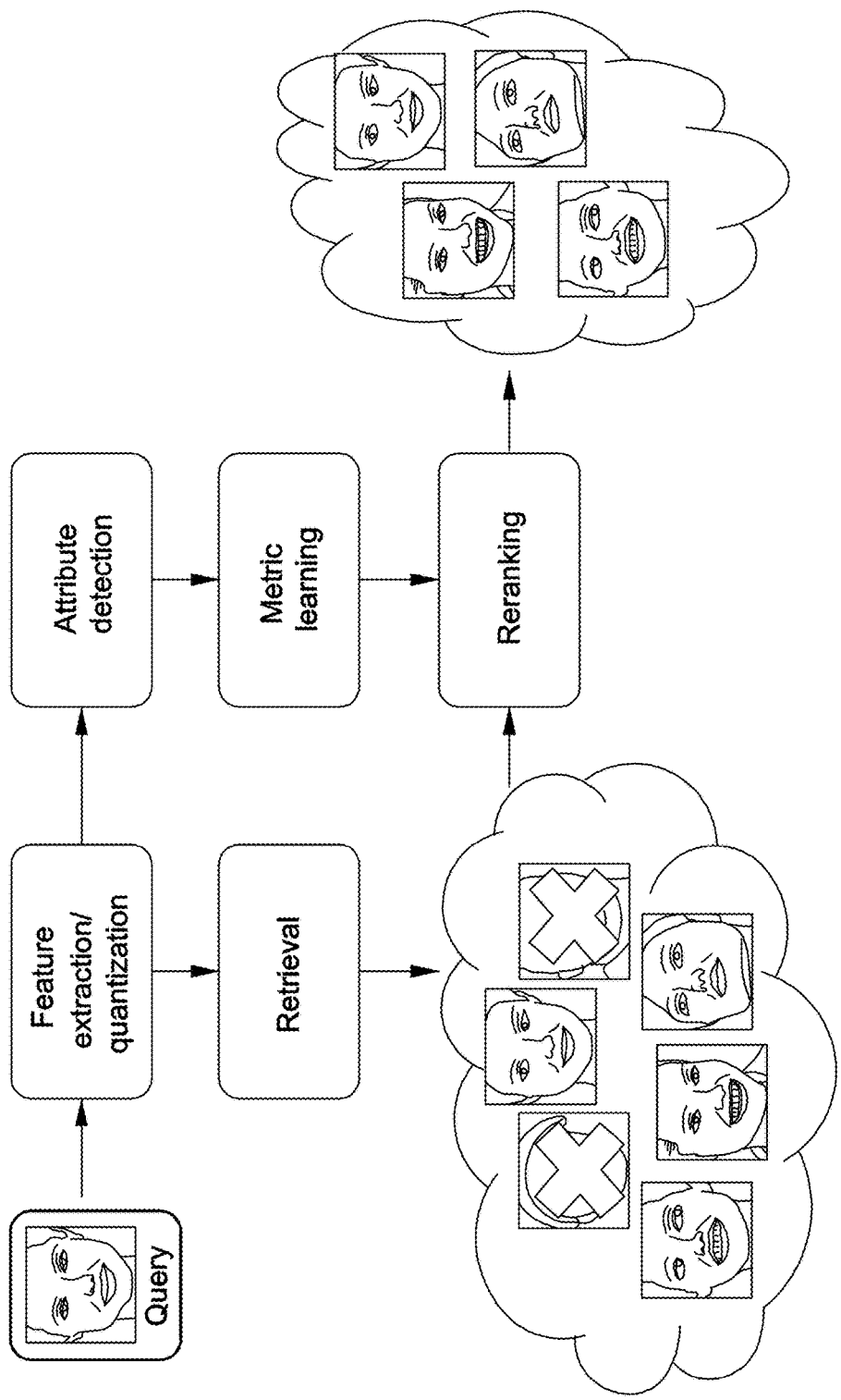
FIG. 11 shows a framework for one embodiment of a face image retrieval and re-ranking system.

FIG. 11 shows a framework for this embodiment of the face image retrieval and re-ranking system in which the retrieval algorithm (e.g. k nearest neighbor search based on low-level features or their quantization) gives some initial search results, and then the re-ranking scheme will re-rank the candidate images.

As shown in FIG. 11, a query image is subjected to the same face detection, alignment and low-level feature extraction as performed on the face images in the large-scale database. Using the low-level features, candidate images are retrieved from the database, where the candidate images are candidates for face images of the same person as the query image. Meanwhile, the query image is subjected to projection into the semantic attribute space using the projection learned in the training phase, and the learned distance metric is applied against the candidate images so as to re-rank the candidate images. Re-ranking of the images might cause some of the candidates to fall out of a top-X group of images, such as the top-10 images, as indicated by bolded X's in this figure. The re-ranked images are thereafter provided as the result images for the query.

In more detail, the top candidate face images are re-ranked using a weighted similarity function to improve the precision. The candidate images returned from the retrieval algorithms are initially ranked only based on the query image. To be more robust to the intra-class variations, such as changes in pose and expression, each candidate is re-ranked based on its average distance to the already ranked images. See Wu [20].

To make a tradeoff between the appearance similarity and attribute similarities, a weighted similarity function is defined as follows:

$$\tilde{d} = (1-\alpha) d + \alpha d_M \quad (c)$$

where d is the low level feature similarity, $d_M$ is the attribute-enhanced similarity which was learned using the distance metric learning, and $\alpha$ is a weighting parameter.

The candidate image may be selected in an iterative way. More specifically, at each iteration, an image I is selected that minimizes the following cost function:

$$D = \tilde{d}(Q, I) + \beta \frac{1}{|\Re|} \sum_i \tilde{d}(R_i, I) \quad (d)$$

where Q is the query image, $\Re = \{R_i\}$ is the already selected images set, and $\beta$ is the weighting parameter.

After each iteration, I is then added to $\Re = \{R_i\}$. The parameters $\alpha$ and $\beta$ can be selected by cross-validation.

Experimental Results: The performance of the attribute-enhanced face image search was evaluated using the public dataset Pubfig (see Kumar [11]). In Pubfig, 90 images from 43 individuals are taken as gallery images and 10 images each from these 43 persons as the query set. For the metric learning, the training dataset contains 3,000 intra and 3,000 extra personal pairs each. The pairs are sampled from 30 individuals. And the individuals that appear in image search (including query and gallery set) do not appear in the training dataset for metric learning. Additionally the attributes for the images could be the output of any attributes classifiers. In these experiments the above-noted attribute classifiers are used.

Experiment Setting: All images are cropped and geometrically normalized using the locations of the eyes and mouths detected by the above-described face detector. The aligned faces are normalized to 200 by 200 pixels. The 43 individuals are randomly selected from Pubfig.

From HOG feature extraction, five (5) semantically meaningful parts are used from each face. Each part is divided into 8 by 8 blocks. The number of oriented bins is set to 31. For dimensionality reduction, each face part is divided into 4 by 4 blocks and LDA is applied to each block. Eight (8) human attributes are selected which some might consider to be the most significant among all possible visual attributes: gender, Asian, white, black, mustache, senior, young and eyeglasses. Therefore, a low dimensional vector results with length eight (8) in each block. For each face, the total length of the attribute vector is 5×16×8=640.

For the metric of search performance, the mean average precision, P@10 and P@20 are calculated for the query set. P@n is defined as the percentage of correctly recalled images (the percentage of person matches to the query) in the top n ranked images. Mean average precision (MAP) is also used as an evaluation metric.

Figures 12, 13:
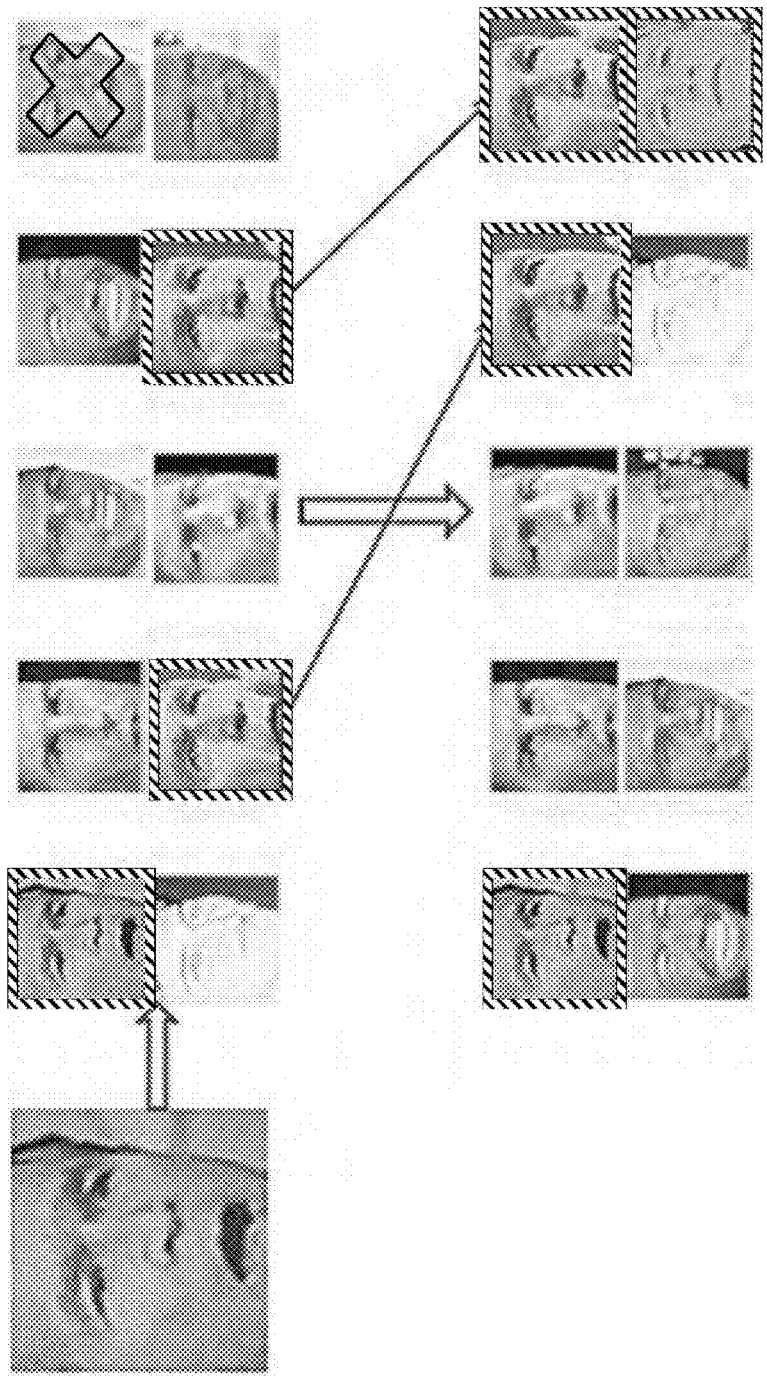
FIG. 12 is a table comparing the precision of face retrieval for different retrieval methods.
FIG. 13 is a visualization of the comparison in FIG. 12, which compares the precision of face retrieval for different retrieval methods.

FIG. 12 is a table comparing the precision of face retrieval for different retrieval methods. FIG. 12 thus shows the precision of face retrieval after re-ranking using low leveled features, attribute features and attribute enhanced re-ranking.

For visualization purposes, the results are also visualized in FIG. 13, for example query results.

From FIG. 13 it can be seen that there are 7 false positives in the top 10 images which are returned by the approach using low leveled features. After re-ranking based on the combined similarity function, the false positives are reduced to 6 and the ranking of the relevant images are also improved. It will also be observed that the woman's face image returned by using low level features similarity disappears in the top 10 of search results.

In summary for this embodiment, attribute-enhanced features of face images are extracted using linear discriminant analysis in a part-based way. Then the face similarity is learned in the attributes feature space under the framework of metric learning under an equivalence constraint. Image re-ranking scheme is explained based on a similarity function combining the low level features similarity and attributes-enhanced feature similarity.

<A Second Implementation>

Referring to the FIG. 1 architecture, a second implementation will now be described.

By way of further background applicable generally herein, according to Gabarron [1], an explosion of social media has been observed, such that (for example) 72 hours of videos are uploaded to YouTube every minute and about 1.54 million photos are uploaded to Flickr everyday. Facebook processes around 350 million image uploads per day. See Kotenko [2]. With such gigantic amount of data, many applications are arising with various algorithms being developed, such as large scale image retrieval (see Gong [3] and Zhang [4]), automatic image annotation (see Tang [5] and Tang [6]), social recommendation (see Ma [7] and Eirinald [8]), video concept detection (see Zha [9] and Geng [10]), etc.

Additionally, among these images, it is estimated that a significant fraction (about 45%) of images contain human faces. See Kumar [11]. The automatic analysis of human face content is of great interest to enable many applications such as applications for face tagging (see Zhu [12]), name-based face search (see Wang [13]), and forensic face matching (see Jain [14]), with such application generally demanding scalability and accuracy to retrieve faces from a large pool. The design of feature descriptors is a consideration in a retrieval framework. There have been increasing efforts in developing robust feature descriptors and the nature of these descriptors spans a wide range, from low-level image features (see Wei [15] and Deselaers [16]) to higher-level attributes or semantic cues (see Siddiquie [17], Cai [18], Kuo [19] and Zhang [4]).

For face images, accurate retrieval remains a difficult task. In real-world photos there are large variations in pose, expression, illumination, occlusions, blur, image quality, etc. As a consequence, face retrieval is challenging at least in part because there is a large degree of visual intra-class (same person) variation which may be on the scale of or even larger than inter-class (different person) variation.

In previous work on face image retrieval, faces are typically described by low-level visual features. See for example, Wu [20], Chen [21], Thang [22]. However, these low-level features (such as Local Binary Pattern (LBP), see Ahonen [23], and Local Phase Quantization (LPQ), see Ahonen [24]) are sensitive to intra-class variations such as pose and expression. Thus, the faces of the desired target may not be successfully retrieved using low level features only.

This description addresses the problem of retrieval of images of objects, such as retrieval of face images, by exploring the use of attributes as semantic cues for determining more discriminative visual feature representations. In general, attributes can be defined as describable object features. Humans are known to tend to use attributes to describe objects, such as gender or age in the case of people, or doors or windows in the case of vehicles. And while attributes such as gender and age can not uniquely identify individual objects, it is generally understood that attributes can be immutable qualities across pose, illumination, and also across short time frames.

In embodiments concerning face images, face image retrieval explores the use of face attributes as semantic cues for determining more discriminative visual feature representations. Other embodiments concern object images of different classes, or combinations of classes, such as object images of vehicles, people or luggage. Salient visual characteristics and attributes for these and other classes of object images have been described hereinabove, and are not repeated here in the interests of brevity.

Figure 14:
FIG. 14 shows multiple different images of one single person, illustrating significant variations in appearance such as pose, illumination, facial expression, occlusion.

FIG. 14 shows multiple different samples of face images of one single person. Note that the appearance of the subject varies significantly in different images. There are significant variations in appearance such as pose, illumination, facial expression, occlusion. However, some attributes of the subject such as gender and age, remain unchanged. Recognizing this, the description herein incorporates attribute information for more accurate object image retrieval, here, face image retrieval. As stated above, attributes in general can be defined as describable object features.

Recently there has been rising interest in the study of attributes. Kumar [25] trained 73 facial attribute classifiers and used attributes for face verification achieving state-of-the art performance. Attributes can also be used as query terms to retrieve images from a large database. See Siddiquie [26]. Beyond binary attributes, relative attributes which contain richer textual description of images have been explored. See Parikh [27].

Directly using attributes for retrieval, however, is not accurate since each individual attribute contains very limited information and is not discriminative enough to retrieve matching images of a query image, such as matching face images of a query subject. On the other hand, low-level features are not robust enough across variations such as pose, illumination and occlusion. To leverage the discriminative abilities of low-level features and invariance of attributes, this embodiment uses an attribute-driven object image retrieval framework. The attribute-driven features are learned (machine learning) from low-level features and retrieval is based on the distance of the attribute-driven features. Specifically, using a few salient semantic face attributes, attribute-driven feature projections are learned such as by using Local Fisher Discriminant Analysis (LFDA).

The low-level features are projected into the attribute-enhanced space and the concatenation of the projected features using different attributes forms the attribute-driven features. To help with scalability, binary K-means hash codes are learned from the attribute-driven features. During retrieval, the binary codes efficiently use Hamming distance calculations. To improve the retrieved results, a re-ranking process based on both low-level features and attribute-driven features is also performed. Experiments are conducted on two public real-world face image database and show that the embodiments described herein outperform the baseline and state-of-the-art methods.

Some features of the embodiment described herein include:

First, an attribute-driven object image retrieval framework. Attribute information is used to transform the low-level features to attribute-driven features, by which attribute information is encoded into low-level image features for better image retrieval performance. Thus, in advancing the state of the art, this description contributes region-based supervised dimensionality reduction techniques, wherein the regions comprise salient visual characteristics, using attributes in a supervisory role.

Second, attribute-driven object image retrieval is made applicable to large-scale image databases by using binary K-means hashing codes. A large-scale database typically contains millions or multiple millions of images, on a scale so large that it would be wholly impracticable for either training or retreival to be accomplished by human effort alone. The embodiments described herein are computerized, as described below.

Third, a re-ranking scheme is used to improve the retrieval accuracy by using both the visual appearance information from low-level features and the attribute information from attribute-driven features.

Related work is described by the citations made at paragraph [0005], above. Additional related work is described in the following few paragraphs.

Many image features have been contemplated, aiming at faithfully describing image contents. For image retrieval, low-level features have been designed and utilized in early work. Wei [15] studied the combination of low-level features referred as "decisive" feature patterns in an effort to better describe the image contents. Deselaers [16] conducted experiments on content-based image retrieval (CBIR) using a large number of different low-level image features and recommended color histogram as a simple baseline for many applications. Beyond low-level features, higher level attributes or semantics have been investigated. A method for multi-attribute retrieval was proposed in Siddiquie [17], which explored the correlations between the attributes. In addition, ranking and retrieval were integrated using the same formulation. Cai [18] introduced an image search re-ranking scheme based on semantic attributes. Each image was represented by attribute scores predicted from trained attribute classifiers. Kuo [19] jointly utilized both image contents and associated textual information to extract semantic information from both modalities. The Kuo framework is said to discover semantic features in textual and image graphs in an unsupervised manner. Zhang [4] proposed an attribute-augmented semantic hierarchy (A2SH) which is said to bridge both the semantic and intention gaps in CBIR. The semantic concepts were divided into multiple semantic levels and each concept was augmented with relevant attributes. Improved accuracy on large scale dataset was reported compared to the state-of-the-art CBIR systems.

Many efforts have focused on the specific task of face image retrieval as one significant aspect of CBIR. For example, Thang [22] proposed a face image retrieval system based on constrained independent component analysis (cICA). cICA uses a priori constraints to extract independent components from data and by using query images as constraints, the independent components that share similar probabilistic features with the queries are extracted. Wu [20] used identity-based quantization and component-based local features for scalable face image retrieval in large scale dataset. A multi-reference re-ranking process is performed to refine the initially returned results. Sparse coding with an identity constraint for face image retrieval was presented in Chen [28]. This framework included a coding scheme said to quantize faces with large intraclass variations into similar visual words if they share the same identity. Chen [21] proposed large scale face image retrieval using multi-level features which was said to take advantage of various scales of features to incorporate more person-specific information. By using simple features, the multi-level features of Chen [21] was said to achieve state-of-the-art retrieval performance. A face search technique based on shape manipulation was proposed in Smith [29]. In this method, users are able to drag some contour points to search for faces similar in shape to the query face but with updated geometric attributes.

Attribute detection and its application is apparently an emerging trend in computer vision. Kumar [25] introduced describable visual attributes for image search and face verification. In this work, 73 attribute classifiers (e.g., gender, square face, eye shape) were trained separately using SVM and the typical range of detection accuracy was between 70% and 90%. Face verification and image search using attributes was said to achieve comparable or better results compared to state-of-the-art methods. In Schierer [30], multi-attribute spaces were constructed from attribute classifier outputs based on the statistical extreme value theory. In this case, scores from different attribute classifiers were combined and results on large dataset were said to show improvement over prior work. Parikh [27] introduced relative attributes to relax the restrictions on current categorical labels such as "smiling" or "not smiling". Relative attributes such as "bears are furrier than giraffes" were used on face and natural scene datasets, and relative attributes were said to show advantages over traditional binary attributes. On the other hand, Yu [31] used a large pool of weak attributes that can be easily obtained with little or no human effort for image retrieval. A mode of feedback for image search using relative attributes was proposed in Kovashka [32]. Given a query, the system of Kovashka [32] presents the user an initial set of reference images and the user provides relative attribute feedback in order to refine the top ranked images to better suit the user's requirement.

Despite the afore-mentioned work in CBIR (content-based image retrieval) and attributes, very few approaches are known to jointly use low-level features and attribute information for object image retrieval, much less face image retrieval. Recently, however, Chen [33] proposed to use attribute-enhanced sparse codewords for scalable face image retrieval. Attribute-enhanced sparse codewords were learned in an off-line stage. Given a query image, its code-words and attributes were obtained and the codewords as well as the binary attribute signature were used in the retrieval process. Inverted index was applied in an effort to ensure scalability for retrieval from large datasets.

The embodiments described herein differ at least in the aspect that there is machine-based learning of the attribute-driven features from low-level features, such as by supervised projection learning. In addition, the embodiments described herein differ at least in the aspect of a re-ranking process to refine the returned results by leveraging the attribute-driven feature distance as well as the low-level visual feature distance.

Figure 15:
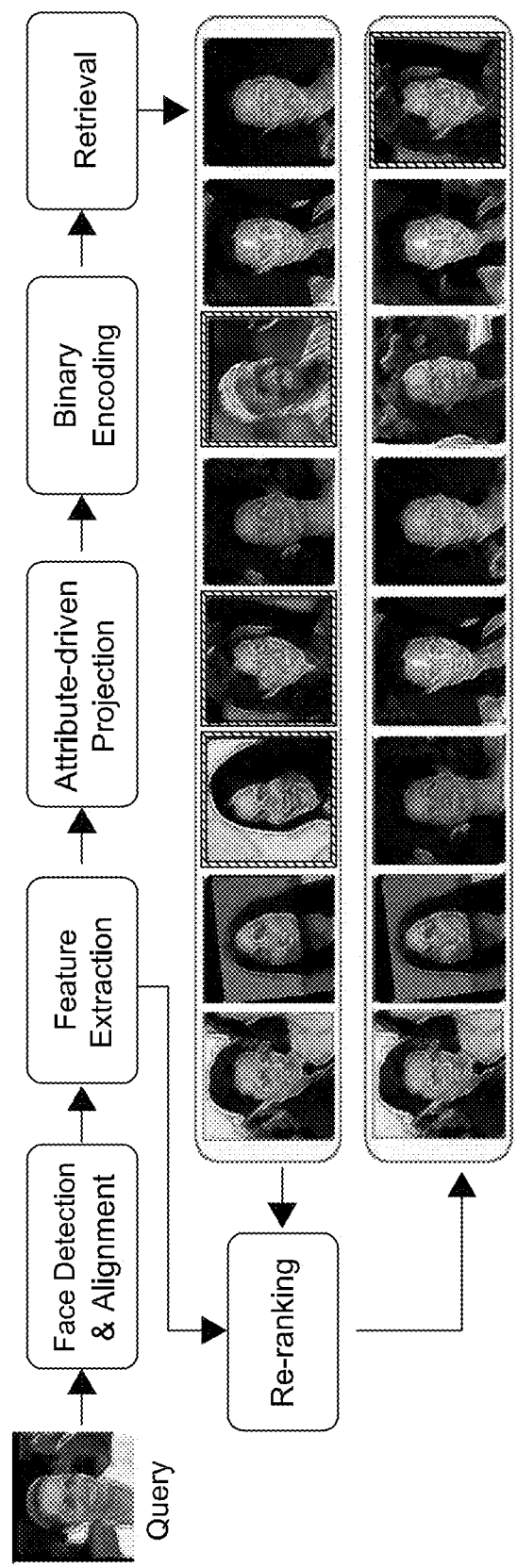
FIG. 15 is a system level diagram illustrating one embodiment for attribute-driven retrieval of face images based on a query image.

A system level diagram illustrating one embodiment is shown in FIG. 15. Thus, FIG. 15 shows a system level diagram for attribute-driven retrieval of object images based on a query image, such as the attribute-driven retrieval of face images based on a query image. The system shown in FIG. 15 searches for similar images to a query image using attribute-driven features and a image re-ranking scheme that fuses low-level visual information with attribute relevant information. Cross-hatched boxes enclose the incorrect matches. After re-ranking, both the number of incorrect matches and the ranks of the mismatches are decreased.

As seen in FIG. 15, the system starts by performing face detection and alignment on the query image. Low-level features are extracted from various regions of the aligned face. Then the low-level features are transformed to attribute-driven features where the transformation is learned from a set of attribute labeled faces. Binary codes are then generated from the attribute-driven features to improve the scalability of the approach. Using the binary codes retrieval is performed and a list of candidate images are found. Finally, the candidate images are re-ranked based on a combination of both the low-level visual feature distance and the attribute-driven feature distance.

Face Detection and Alignment: For face detection a Viola-Jones face detector may be used. See Viola [34]. The face detector is trained using images from the Internet to robustly detect frontal and near-frontal faces in real-world images. In addition, trained eye and mouth detectors are used to detect the centers of the two eyes and the center of the mouth. Using these three key locations, all the faces are aligned to a canonical position and the faces are re-scaled to 200×200 using bi-cubic interpolation.

Component-based Feature Extraction: For feature extraction, the component-based scheme of Chen [21] and Wu [20] is adopted.

Figure 16:
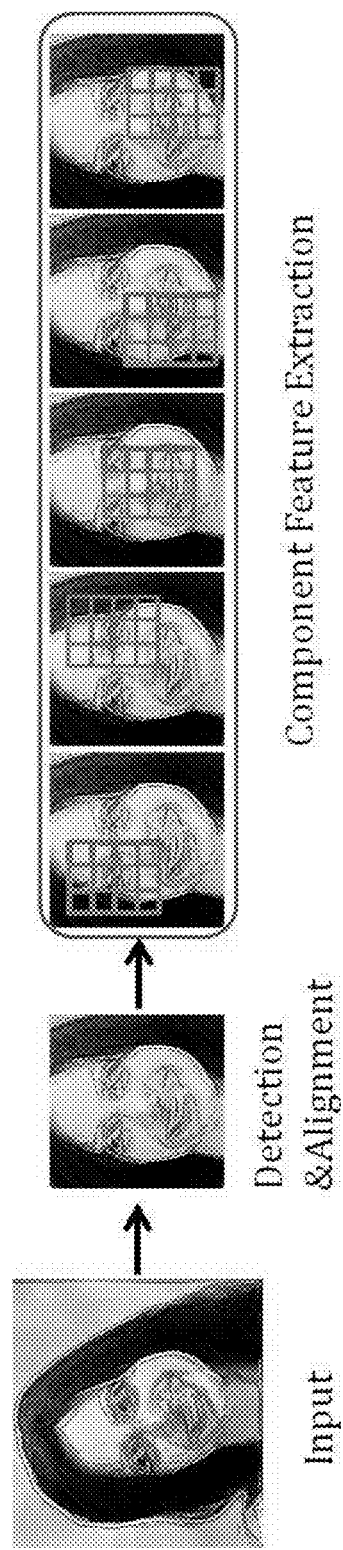
FIG. 16 is an illustration showing an example of face detection and alignment, and feature extraction after face detection and alignment.

FIG. 16 is an illustration showing an example of face detection and alignment, and feature extraction after face detection and alignment. After the face is aligned, features are extracted in grids from 5 different regions of salient visual characteristics: left eye, right eye, nose, left part of mouth, and right part of mouth.

As shown in FIG. 16, after alignment, features are extracted in grids from 5 different regions including two eyes, two mouth corners and nose. One advantage of using component-based features over features from the entire face is that the extracted features are tolerant to local component deformations and are more robust to changes in pose and expression. In this embodiment, a 8×8 cell grid is defined for each face component.

For the selection of the low-level feature descriptor, this embodiment uses Histogram of Oriented Gradients (HOG). HOG was originally applied to human pedestrian detection. See Dalal [35]. Recently it has also been applied to face recognition, achieving competitive results. See Dèniz [36]. HOG operates by first computing the image gradients in local cells in the horizontal and vertical directions of an image. The orientation for each pixel is binned into evenly divided orientation channels spreading from 0-180 or 0-360 degrees. Since HOG is a local-region based descriptor, it tolerates some geometric and photometric variations. In addition, as compared to other features such as color histograms, HOG features are less sensitive to illumination change.

Attribute-driven Feature Projection: The attribute-driven features are generated by projecting the low-level features into an attribute-discriminative subspace via supervised learning. This embodiment uses Local Fisher Discriminant Analysis (LFDA) to learn the subspace mapping supervised by the attribute labels. See LFDA at Sugiyama [37]. LFDA is a supervised feature learning method which inherits the concept of dimensionality reduction found in Fisher Discriminant Analysis (FDA) (see Fukunaga [38]) while preserving the local neighborhood structure as that in Locality Preserving Projection (LPP) (see He [39]). LFDA is easily computed by solving a generalized eigenvalue problem and thus is scalable to large datasets.

Given data $X=\{x_1, x_2, \ldots, x_n\}$ consisting of n samples with feature dimension d and possible class labels $\{1, 2, \ldots, C\}$, a transformation T is sought such that $$z_i = T^T x_i \qquad (1)$$

where $z_i \in R^d$ ($1 \leq m \leq d$) is the projected feature of $x_i$.

FDA finds the transformation that maximizes the between-class scatter while minimizing the within-class scatter of the projected data. The within-class scatter matrix $S^w$ and the between-class scatter matrix $S^b$ are defined by $$S^w = \sum_{l=1}^{C} \sum_{i:y_i=l} (x_i - \mu_l)(x_i - \mu_l)^T \qquad (2)$$

$$S^b = \sum_{l=1}^{C} n_l (\mu_l - \mu)(\mu_l - \mu)^T \qquad (3)$$

where l is the class label, $\mu_l$ is the mean of data belonging to class l, t is the mean of all data, and $n_l$ is the number of data elements in class l. The transformation matrix $T_{FDA}$ is calculated by $$T_{FDA} = \underset{T \in R^{d \times m}}{\operatorname{argmax}} \left[ tr\left( (T^T S^w T)^{-1} T^T S^b T \right) \right] \qquad (4)$$

FDA can find at most C−1 meaningful features for C classes. This is a limitation in the practical usage of FDA for dimensionality reduction. Essentially, an attribute discriminative subspace is sought for the semantic attribute features, however with a limited number of attributes it may not always be possible to retain enough information to discriminate individuals accurately.

In addition, FDA treats all data without regard to the inherent structure in the data. Thus, for the case when data coming from the same class has local variations, the performance of FDA may sometimes degrade.

As an alternative, LPP takes into account the local structure of data by using an affinity matrix A in its formulation. Given n data points, the affinity matrix A is of size n×n where $A_{i,j}$ measures the affinity between $x_i$ and $x_j$. The transformation $T_{LPP} \in R^{d \times m}$ is calculated by $$T_{LPP} = \underset{T \in R^{d \times m}}{\operatorname{argmin}} \left[ \frac{1}{2} \sum_{i,j=1}^{n} A_{i,j} \| T^T x_i - T^T x_j \|^2 \right] \qquad (5)$$

subject to $T^T X D X^T T = I$, where X contains n data points and D is a diagonal matrix with i-th diagonal element equals to $$D_{i,j} = \sum_{j=1}^{n} A_{i,j} \qquad (6)$$

According to this formulation, LPP only cares about discovering a transformation that makes similar data elements similar to each other in the subspace. LPP generates a subspace of arbitrary dimensionality m, where the smaller m is, the smoother (or more regularized) the transformation is from one locality to another. Thus the choice of m is more limited by the number of training samples than the number of attribute classes (which was the case for FDA). Although LPP accommodates the local structure of data, it is not explicitly attribute discriminative since it is generated in an unsupervised manner.

The formulation of LFDA combines the merits of both FDA and LPP. In LFDA, the local within-class scatter matrix $\tilde{S}^w$ and local between-class scatter matrix $\tilde{S}^b$ are defined by $$\tilde{S}^w = \frac{1}{2}\sum_{i,j=1}^{n} A_{i,j}^w (x_i - x_j)(x_i - x_j)^T \quad (7)$$

$$\tilde{S}^b = \frac{1}{2}\sum_{i,j=1}^{n} A_{i,j}^b (x_i - x_j)(x_i - x_j)^T \quad (8)$$

where $$A_{i,j}^w = \begin{cases} \frac{A_{i,j}}{n_l} & \text{if } y_i = y_j = 1 \\ 0 & \text{if } y_i \neq y_j \end{cases} \quad (9)$$

$$A_{i,j}^b = \begin{cases} A_{i,j}\left(\frac{1}{n} - \frac{1}{n_l}\right) & \text{if } y_i = y_j = 1 \\ \frac{1}{n} & \text{if } y_i \neq y_j \end{cases} \quad (10)$$

The transformation $T_{LFDA} \in R^{d \times m}$ is calculated by $$T_{LFDA} = \underset{T \in R^{d \times m}}{\mathrm{argmax}}\left[tr\left((T^T \tilde{S}^w T)^{-1} T^T \tilde{S}^b T\right)\right] \quad (11)$$

In this embodiment, for each attribute $a_k$, where $k=1, \ldots, K$, there is learning of a LFDA projection $T_{a_k}$ to transform the original low-level feature x in each cell of a face component to the attributed encoded feature $z_{a_k}$. The attributed encoded features using K different attributes are then concatenated. In this step, the original features in one cell $x \in R^d$ are mapped to $$z_{a_k} \in R^m$$

where k denotes a specific attribute type. The final attribute-driven features for one cell is $$[z_{a_1}, z_{a_2}, \ldots, z_{a_K}].$$

The attribute-driven features for the entire face is the concatenation of features from all cells.

Figure 17:
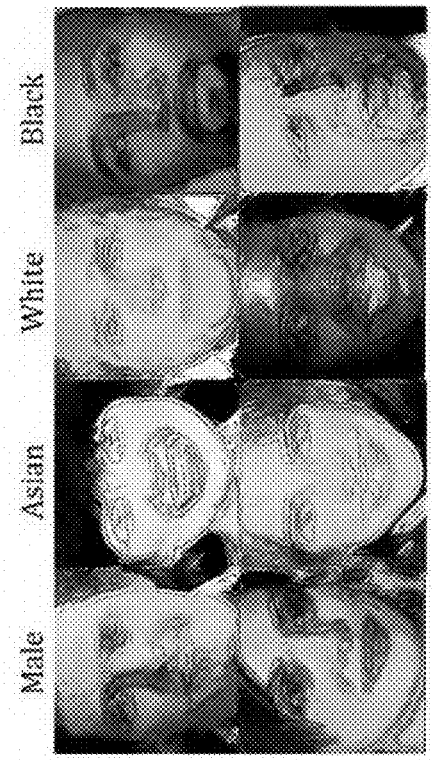
FIG. 17 is a table showing an example of different attributes selected for use in an example embodiment.

In total eight (8) different attributes are selected for this embodiment and are listed in FIG. 17. These attributes are currently considered most salient to detect and describe.

Figure 18:
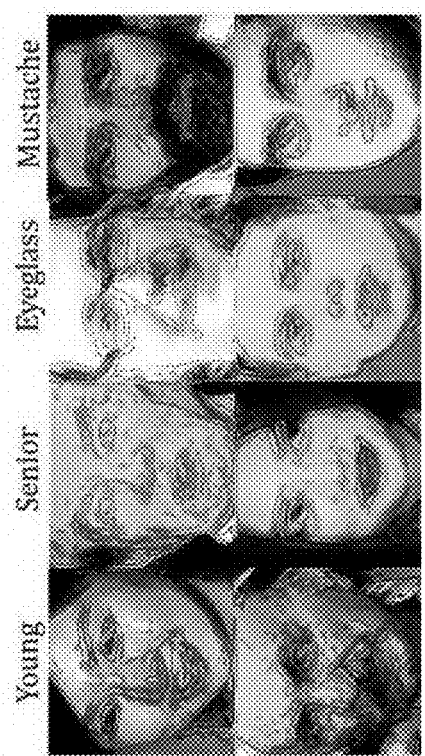
FIG. 18 shows some sample images for the attributes listed in FIG. 17.

Thus, FIG. 17 is a table showing an example of different attributes selected for use in an example embodiment, and FIG. 18 shows some sample images for the attributes listed in FIG. 17. FIG. 18 in particular shows sample images with 8 different attributes used in the proposed method. Both positive and negative samples are shown.

In this embodiment certain attributes that might otherwise be considered as semantic attributes are deliberately not used as they are considered too transient, too subjective, too trivial, and the like. For example, attributes such as "wearing lipstick" and "pale skin" are deliberately not used. Compare Kumar [25]. Such attributes are trivial and difficult to extract when imaging conditions vary (e.g., low-resolution, illumination change) and are prone to detection error. For learning the LFDA mapping for each attribute, this embodiment uses additional face images collected from the Internet that are independent from and have no identity overlap with the face images used as probe or gallery images in the experiments described herein. Specifically, for each attribute, 1,000 positive sample images are manually labeled together with 1,000 negative sample images to learn the LFDA projections for this attribute.

K-Means Hashing for Binary Encoding: Using attribute-driven features for image retrieval becomes impractical when the search space is large. To overcome the issue of scalability in image or video retrieval tasks, approximate nearest neighbor (ANN) search is widely used. See for example Jegou [40] and Sivic [41]. To generate compact codes for ANN search, various techniques have been proposed including locality sensitive hashing (LSH) (see Torralba [42] and Andoni [43]), vector quantization (see Poursistani [44]), and product quantization (see Jegou [45]). This embodiment uses a recently proposed hashing method: affinity preserving K-means hashing to simultaneously quantize the features and approximate the distance in the original feature space. See He [46]. In this technique, hashing refers to the generation of compact binary codes which can be compared using the Hamming distance.

One goal is to learn a codebook C such that a m-dimensional feature z can be mapped to a quantized vector $q(z) \in C = \{c_i \in R^m | 0 \leq i \leq k-1\}$ and k is the number of codewords which is upper bounded by $k=2^m$. The objective function in K means hashing involves two parts: average quantization error $E_{quan}$ and the affinity error $E_{aff}$. Given training set S with n samples, $E_{quan}$ is defined by $$E_{quan} = \frac{1}{n}\sum_{z \in S} \|z - c_{i(z)}\|^2 \quad (12)$$

where i(z) is the index for sample z.
The affinity error $E_{aff}$ is defined by $$E_{aff} = \sum_{i=0}^{k-1}\sum_{j=0}^{k-1} w_{ij}[d(c_i, c_j) - s \cdot d_h(i, j)]^2 \quad (13)$$

where $d_h$ is the Hamming distance, s is a scaling factor that sets the Hamming distance measure to the same scale as the original metric scale, and $$w_{ij} = \frac{n_i n_j}{n^2},$$

in which $n_i$ and $n_j$ are the number of samples having index i and j. The intuition is that the distance $d(c_i,c_j)$ is approximated by $d_h(i,j)$ and the fast Hamming distance computation can thus be taken advantage of. The overall objective function to optimize is given by $$E = E_{quan} + \lambda E_{aff} \quad (14)$$

and the minimization is performed in an alternating fashion. See He [46].

Although this K-means hashing based retrieval is an exhaustive linear scan, it is very fast in practice since the bit XOR computation is extremely efficient with modern computers. As tested by He in [46], to scan one million 64-bit codes takes only 1.5 ms. By learning the K-means hashing codes from original features, the retrieval process is scalable to large database.

Retrieval and Re-Ranking: In the off-line process, the binary codes for gallery images are calculated and stored. For retrieval, given a probe image, its low-level features are extracted first. Using the previously learned LFDA transformations, the attribute-driven features are obtained for each attribute and concatenated. The concatenated attribute-driven features are subsequently encoded to binary codes. The binary codes of the query is then searched among the gallery and the most similar gallery faces are returned. Due to the binary encoding, the initial retrieval with the Hamming distance computation is very efficient, even for large scale datasets.

To further improve the retrieval results, a re-ranking process is applied to the top N returned results. The re-ranking is based on the distance defined by $$D = \alpha \cdot d_{appr} + (1-\alpha) \cdot d_{attr} \quad (15)$$

where $d_{appr}$ measures the appearance distance between a query image and a gallery image using low-level features, $d_{attr}$ measures the distance between query image and gallery images using attribute-driven features, and $\alpha$ is a distance weight between 0 and 1. The intuition is that the returned gallery subjects were selected based on attribute-driven features, but from these attribute-driven query results low-level visual similarity should play a role in the ranking of the results. The distance D allows for results with a balance of appearance and attributes at the same time.

Experiments were performed using public large-scale datasets of face images. These experiments followed the experimental protocols of Chen [33]. Two public datasets are used to evaluate our proposed method. The first dataset is "Labeled Faces in the Wild" (LFW) (see Huang [47]), which contains 13,233 images of 5,749 different people, among which 1,680 people have more than one image. Those images were taken in uncontrolled environments in which the pose, illumination, expression vary significantly. Twelve (12) people were selected that have more than 50 images each as query subjects. For each person, ten (10) images are randomly sampled as query images. In total there are 120 query images and the remaining 13,113 images from the dataset are used as gallery images.

Figures 19, 20:
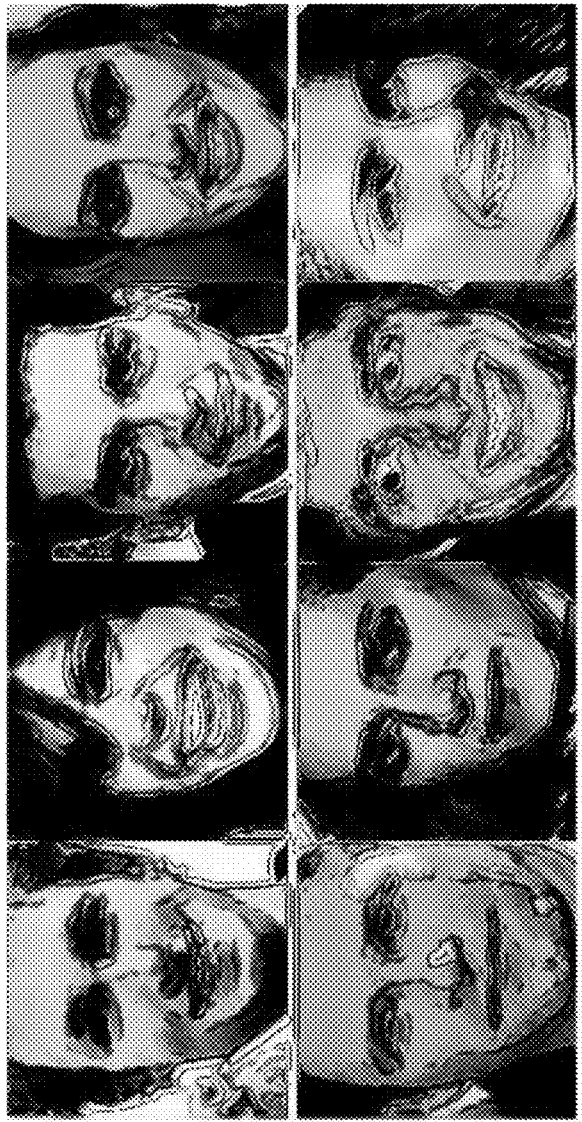
FIG. 19 is a table summarizing characteristics of two datasets used in the experiments.
FIG. 20 shows sample images from the two datasets summarized in FIG. 19.

The second dataset is the Pubfig dataset described by Kumar at [48]. The Pubfig dataset contains 58,797 real-world images of 200 people collected from the Internet. One hundred (100) images were randomly selected for each subject and in total 43 subjects are chosen for the gallery and the query. Ten (10) images for each person are used as query images and the rest of the images are used as gallery. Thus there are 430 query images and 3,870 gallery images. FIG. 19 summarizes characteristics of the two datasets used in the experiments and FIG. 20 shows sample images from the two datasets.

Thus, FIG. 19 is a table summarizing characteristics of the LFW and Pubfig datasets used in the experiments, and FIG. 20 shows sample images from the two datasets summarized in FIG. 19, with sample faces from the LFW dataset being shown at the top and sample faces from the Pubfig dataset being shown at the bottom.

Parameter Settings: For each face component, a cell grid such as a 8×8 cell grid is defined for a total number of 64 cells per component. For HOG feature extraction, this embodiment uses the implementation of Felzenszwalb at [49] with the number of orientation bins set to 9. The HOG feature dimension for each cell is 31. Since each of the 5 components has 8×8=64 cells, the total feature dimension for a face is 5×64×31=9,920. For LFDA, the projected feature dimension m is set to 5 for each attribute. To learn the LFDA projection for each attribute, in total 2,000 manually labeled faces with 1,000 positive samples and 1,000 negative samples are used. Note that the training faces for the LFDA projection were obtained from web-crawled images and are independent of and disjoint from the probe and gallery data. The attribute-driven features after LFDA projection for one face is of dimension 5×64×5×8=12,800 for 8 different attributes. For K-means hashing, the attribute-driven features are quantized to 128-bit binary codes. For re-ranking, the top 200 returned results are re-ranked. The distance weight $\alpha$ in Equation 15 is set to 0.4 which was empirically found to be optimal.

Evaluation Metrics: These experiments used three metrics to evaluate the retrieval performance: mean average precision (MAP), and precision at K (P@K) for K=10 and K=20. Mean average precision (MAP) is the mean of the average precision scores for each query image and is calculated by $$MAP = \frac{1}{N} \sum_{i=1}^{N} \int_{0}^{1} p_i(t) dr \quad (16)$$

where N is the number of queries, and $p_i(r)$ is the precision at recall r for query image i. The precision at K is the ratio between relevant retrieved images and total retrieved images at a cut-off rank K.

Comparison Methods: The baseline method for comparison directly uses low-level features (HOG) for retrieval without attribute-driven feature projection and re-ranking. To evaluate the performance improvement in each step in the proposed framework, there is a comparison of the performance using attribute-driven features only without and with binary encoding (AF and AFB respectively), and with binary coding and re-ranking (AFB+RR).

With the same experimental protocols, there is a comparison of the embodiment described herein, which is labeled as (AFB+RR), to the sparse coding based method of Chen [33]. In Chen [33] a different adaptation of attribute usage is considered and the comparing methods for retrieval include a sparse representation with dictionary size of 1600 (SC), an attribute-enhanced sparse representation with attributes weights (ASC-W), an attribute-embedded inverted indexing (AEI), and a combination of ASC-W and AEI (ASC-W+AEI). As indicated above Chen [33] may be the only published work using attributes for enhanced-feature-based face image retrieval.

Retrieval Results: In presenting retrieval results of these experiments, there first is a comparison of the results of the methodology described herein with the baseline method using HOG features directly for retrieval. FIG. 21 shows the performance comparison in terms of MAP, P@10, and P@20 for both LFW and Pubfig datasets.

FIGS. 21 and 22 are tables comparing the performance of embodiments described herein against baseline methods, for the two different datasets of LFW and Pubfig.

As seen from FIG. 21, using attribute-driven features (AF) outperforms the direct usage of low-level features (HOG). This is thought to be due to the additional attribute information encoded in the attribute-driven features which helps to determine the identity of the query subject and match with gallery subjects that are not only similar in appearance but also share similar attributes (such as gender and age). Using binarized attribute-driven features (AFB) for retrieval leads to inferior performance compared to using AF directly, this is due to the information loss in the quantization process. However, for scalability, binary quantization is still extremely useful due to the very efficient calculation of the Hamming distance for retrieval. The re-ranking (RR) process after retrieval using AFB boosts the retrieval performance for both datasets. Since only the top returned results are of interests, we re-rank the top results by leveraging the appearance distance from HOG features directly in combination with the attribute-driven features. The effectiveness of re-ranking is validated by the improvement on MAP, P@10, and P@20 after re-ranking.

FIG. 22 compares the embodiment described herein, which is labeled as AFB+RR, with baseline methods from Chen [33].

As seen from FIG. 22, with the same experimental setting, the embodiment described herein using attribute-driven features with re-ranking outperforms the sparse-coding and attribute-embedded inverted indexing method of Chen [33]. On average the MAP improvement of AFB+RR over ASC-W+AEI is 4%, and the P@10 and P@20 achieve improvement of 5% and 6.5% respectively.

Figure 23:
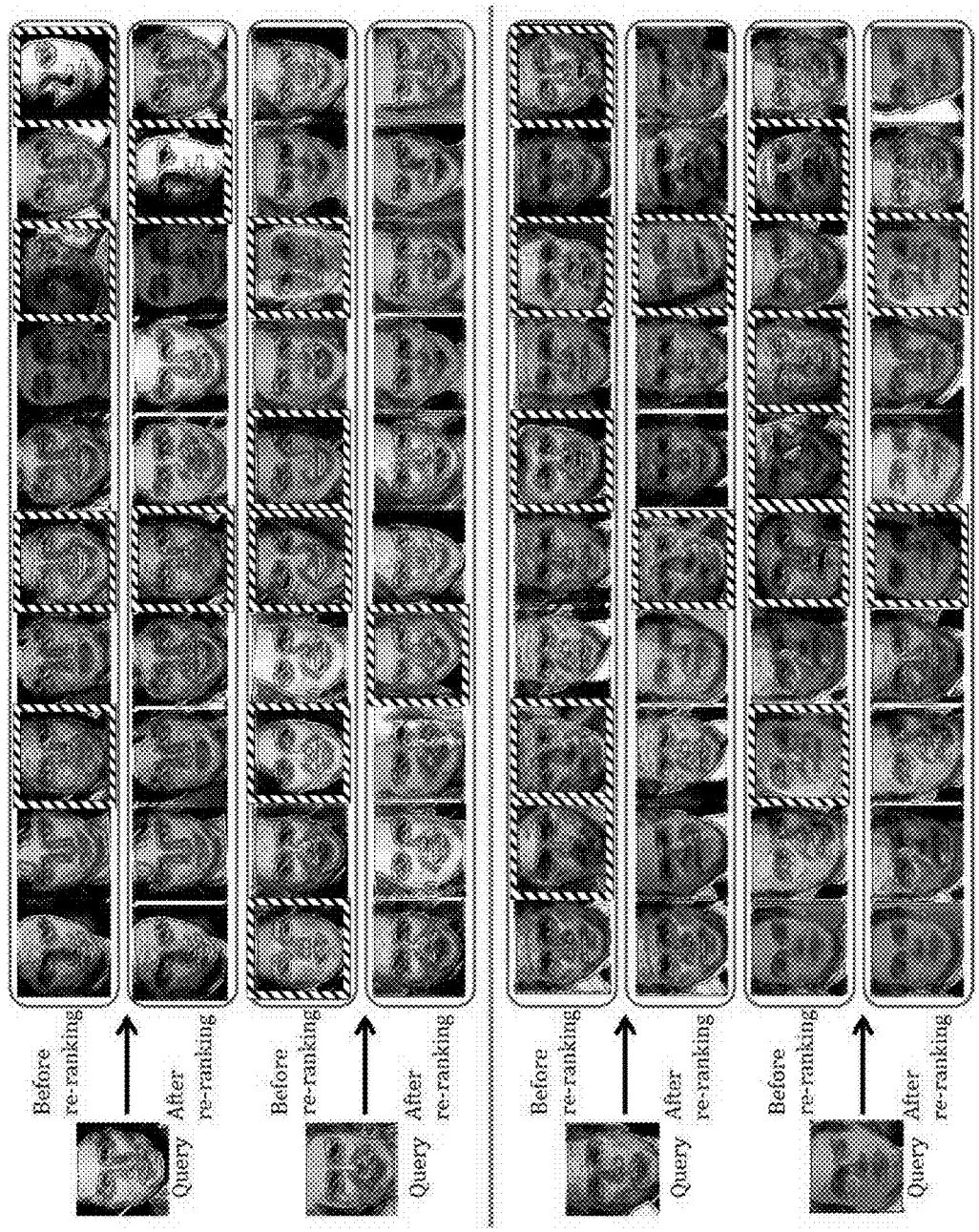
FIG. 23 shows images of some sample retrieval results for the two different datasets, without and with re-ranking.

FIG. 23 shows images of some sample retrieval results for the LFW and Pubfig datasets, without and with re-ranking. In FIG. 23, the top two samples are from the Pubfig dataset and the bottom two samples are from the LFW dataset. Incorrect results are shown in cross-hatched boxes.

As can be seen in the sample results of FIG. 23, after re-ranking the number of incorrect matches is reduced and the rank of the correct matches are increased. Note that most of the incorrect matches share similar attributes with the query subject due to the attribute information encoded into the transformed low-level features. As a result, the risk of retrieving irrelevant subjects with different attributes but similar appearance is reduced.

Figure 24:
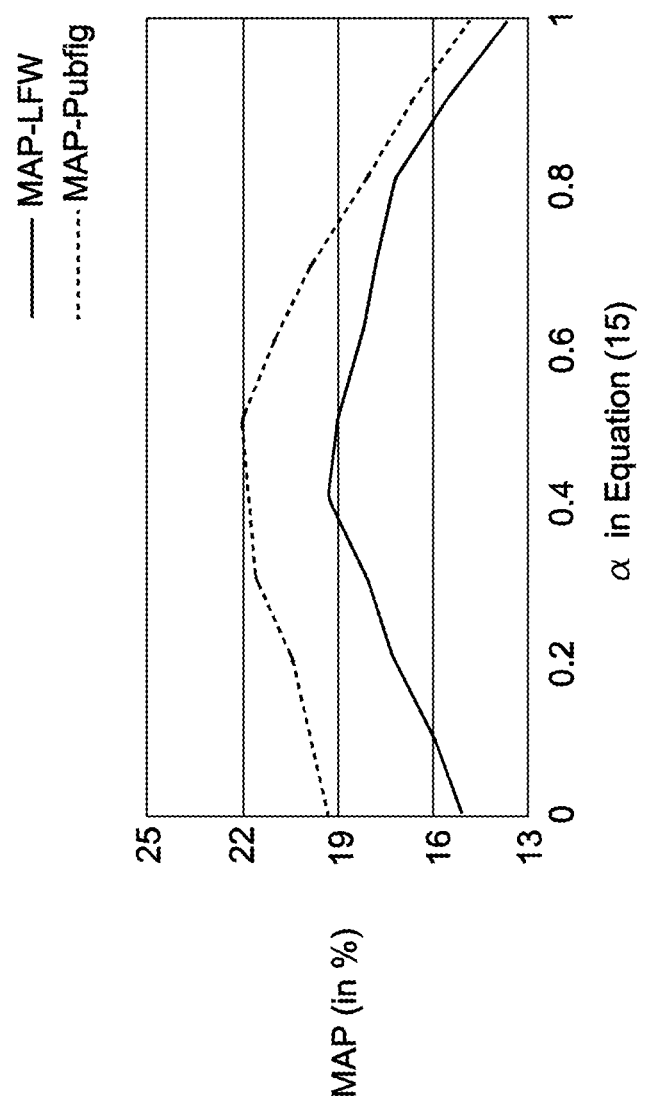
FIG. 24 is a graph illustrating the effect of weighting as between appearance distance and attribute distance, in the re-ranking process.

Effects of Distance Weight in Re-ranking: The re-ranking process leverages the appearance distance (based on low-level features) as well as the attribute distance (based on attribute-driven features). FIG. 24 shows the MAP versus $\alpha$ for two datasets and demonstrates the impact of the distance weight $\alpha$ in Equation 15.

Thus, FIG. 24 is a graph illustrating the effect of weighting as between appearance distance and attribute distance, in the re-ranking process, and shows the impact of the distance functions appearance/attribute trade-off weight $\alpha$ in Equation 15. The highest MAP is achieved when $\alpha$ is close to 0.4 and 0.5. When $\alpha$ is zero the results are purely based on the attribute-enhanced feature matching distance. When $\alpha$ is one the results are purely based on low-level visual feature distance.

As seen in FIG. 24, for the LFW dataset, the highest MAP reaches 19.3% with $\alpha$=0.4. As $\alpha$ goes larger or smaller, the MAP performance drops. A similar trend is observed for the Pubfig dataset where highest MAP is 22% when $\alpha$ equals to 0.5 and is similar at 21.8% when $\alpha$=0.4. The performance with different values of $\alpha$ indicates that for the re-ranking process to work with special effectiveness, it is often better to consider both appearance distance and attribute distance in determining the final rank of the returned results of gallery images.

Retrieval Time: Given a query face, the time for retrieval mainly consists of five parts: low-level feature extraction, attribute-driven feature mapping, binary encoding, initial search, and re-ranking. In an actual implementation, the embodiment described herein was implemented in Matlab on a laptop with Intel i7 2.4 GHz CPU and 8 GB RAM. On average for one query image, the low-level feature extraction takes 0.006 second. Attribute-driven feature mapping using the learned LFDA projections takes about 0.01 second. The time for binary encoding is about 0.005 second.

On the LFW dataset, the initial search for one query takes 0.07 second and on Pubfig dataset it completes in 0.006 second using binary codes with Hamming distance computation. On the other hand, direct search for one query with attribute-driven features takes 0.41 second on the LFW dataset and 0.12 second on the Pubfig dataset. Thus, the binary encoding significantly speeds up the search, making it applicable to large-scale datasets. In terms of re-ranking, for the top 200 returned results re-ranking takes 0.01 second. Note that the implementation is not optimized and further speed up can be achieved using parallel computing and/or C++ implementation.

Some Conclusions: This embodiment describes an attribute-driven face image retrieval method is proposed. Unlike previous work that relies on low-level visual features to retrieve similar images from a gallery given a query image, the embodiment herein utilizes attribute information to project low-level features to attribute-driven features in a supervised manner. The projection is learned using Local Fisher Discriminant Analysis (LFDA). Binary encoding of attribute features is applied to ensure scalability since the retrieval using binary codes by Hamming distance is very efficient. After initial retrieval results are obtained, the top returned results are refined by a re-ranking process in which an appearance-based distance (based on low-level features) and an attribute-enhanced feature distance (based on attribute-driven features) are fused to obtain a refined ranking. A comparison is given of the performance of the embodiment herein on two public real-world face image datasets against state-of-the-art work which also utilize low-level features and attribute information for face image retrieval. Experimental results showed that the embodiment herein achieves superior results compared to baseline and state-of-the-art methods.

Currently HOG features are used in the framework described herein, but it will be understood that the embodiment herein can be extended by those of ordinary skill once informed by the instant application, to use more or different low-level features and attributes, and the embodiment is naturally scalable to much larger datasets.

Other Embodiments

It will be appreciated that the features of the above embodiments can be combined one with the other in a manner that will be apparent to those of ordinary skill once informed by the description herein.

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), microdrive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a non-volatile memory card, a flash memory device, a storage of distributed computing systems and the like. The storage medium may be a function expansion unit removably inserted in and/or remotely accessed by the apparatus or system for use with the computer processor(s).

This disclosure has been presented for purposes of illustration and description but is not intended to be exhaustive or limiting. Many modifications and variations will be apparent to those of ordinary skill in the art who read and understand this disclosure, and this disclosure is intended to cover any and all adaptations or variations of various embodiments. The example embodiments were chosen and described in order to explain principles and practical application, and to enable others of ordinary skill in the art to understand the nature of the various embodiments. Various modifications as are suited to particular uses are contemplated. Suitable embodiments include all modifications and equivalents of the subject matter described herein, as well as any combination of features or elements of the above-described embodiments, unless otherwise indicated herein or otherwise contraindicated by context or technological compatibility or feasibility.

The invention claimed is:

1. A method for retrieval of images from a large-scale database of images, comprising:
   obtaining a user designation of a query image;
   extracting features representative of the query image;
   searching the large-scale database of images to obtain a candidate set of images from the large-scale database of images based at least in part on similarity of the features for the query image to features of the images in the large-scale database of images;
   ranking the obtained candidate images;
   projecting the query image into a subspace that captures semantic attributes; and
   re-ranking the ranked candidate images based at least in part on similarity of a result of projecting the query image into the subspace that captures semantic attributes to a result of projecting the images in the large-scale database of images into the subspace that captures semantic attributes, wherein the similarity of the result of projecting the query image into the subspace that captures semantic attributes to the result of projecting the images in the large-scale database of images into the subspace that captures semantic attributes is measured by a distance metric that measures distances between attributes.

2. The method according to claim 1, wherein the projection into the subspace that captures semantic attributes, and the distance metric, are both learned in a training phase from the large-scale database of images labeled with semantic attributes.

3. The method according to claim 2, wherein the projection into the subspace that captures semantic attributes uses linear discriminant analysis (LDA) from part-based HOG (Histogram of Oriented Gradients) features with human attributes as LDA class labels.

4. The method according to claim 1, further comprising object detection and alignment of the query image using algorithms that are also applied to the images in the large-scale database of images during a training phase from the large-scale database of images.

5. The method according to claim 1, wherein re-ranking is also based at least in part on similarity of the features for the query image to features of the candidate images, using a weighting factor that applies respective weights to similarity of the projection and to similarity of the features.

6. The method according to claim 5, wherein the weighting factor is learned in a training phase from the large-scale database of images labeled with semantic attributes.

7. An apparatus for retrieval of images from a large-scale database of images, comprising:
   an interface to a large-scale database of multiple images;
   memory for storing computer-executable process steps; and
   one or more processors for executing the computer-executable process steps stored in the memory;

wherein the computer-executable process steps include steps to:

obtain a user designation of a query image;

extract features representative of the query image;

search the large-scale database of images to obtain a candidate set of images from the large-scale database of images based at least in part on similarity of the features for the query image to features of the images in the large-scale database of images;

rank the obtained candidate images;

project the query image into a subspace that captures semantic attributes; and re-rank the ranked candidate images based at least in part on similarity of a result of projecting the query image into the subspace that captures semantic attributes to a result of projecting the images in the large-scale database of images into the subspace that captures semantic attributes, wherein the similarity of the result of projecting the query image into the subspace that captures semantic attributes to the result of projecting the images in the large-scale database of images into the subspace that captures semantic attributes is measured by a distance metric that measures distances between attributes.

8. A non-transitory computer-readable memory medium which retrievably stores computer-executable process steps for causing a computer to perform the method according to claim 1.

* * * * *